(12) United States Patent
Hoogland

(10) Patent No.: US 6,853,485 B2
(45) Date of Patent: Feb. 8, 2005

(54) INTEGRATED OPTICAL SYSTEM FOR ENDOSCOPES AND THE LIKE

(76) Inventor: Jan Hoogland, 32511 Sea Island Dr., Dana Point, CA (US) 92629

( * ) Notice: Subject to any disclaimer, the term of this patent is extended or adjusted under 35 U.S.C. 154(b) by 0 days.

(21) Appl. No.: 10/204,505
(22) PCT Filed: Feb. 23, 2001
(86) PCT No.: PCT/US01/06084
 § 371 (c)(1),
 (2), (4) Date: Jan. 21, 2003
(87) PCT Pub. No.: WO01/63334
 PCT Pub. Date: Aug. 30, 2001

(65) Prior Publication Data
US 2004/0125445 A1 Jul. 1, 2004

Related U.S. Application Data

(63) Continuation-in-part of application No. 09/511,662, filed on Feb. 23, 2000, now abandoned, which is a continuation of application No. 09/197,590, filed on Nov. 23, 1998, now Pat. No. 6,545,802, which is a continuation of application No. 08/687,910, filed on Jul. 30, 1996, now Pat. No. 5,841,578, which is a continuation of application No. 08/351,481, filed on Dec. 6, 1994, now Pat. No. 5,633,754.

(51) Int. Cl.$^7$ .............................. G02B 9/34; G02B 27/14
(52) U.S. Cl. ......................... 359/435; 359/434; 359/637
(58) Field of Search ................................ 359/363, 637, 359/434–435, 368–390; 600/158–167

(56) References Cited

U.S. PATENT DOCUMENTS

| | | | |
|---|---|---|---|
| 2,519,760 A | 8/1950 | Hett | 359/367 |
| 4,140,364 A | 2/1979 | Yamashita et al. | 359/367 |
| 4,285,578 A | 8/1981 | Yamashita et al. | 359/644 |
| 4,300,812 A | 11/1981 | Nakahashi | 359/432 |
| 4,354,734 A | 10/1982 | Nakahashi | 359/644 |
| 4,545,652 A | 10/1985 | Hoogland | 359/435 |
| 4,575,195 A | 3/1986 | Hoogland | 359/433 |
| 4,598,980 A | 7/1986 | Doi et al. | 359/733 |
| 4,730,909 A | 3/1988 | Takahashi | 359/735 |
| 4,755,029 A | 7/1988 | Okabe | 359/654 |
| 4,784,118 A | 11/1988 | Fantone et al. | 600/160 |
| 4,822,154 A | 4/1989 | Oxford et al. | 359/367 |
| 4,964,710 A | 10/1990 | Leiner | 600/162 |
| 4,984,878 A | 1/1991 | Miyano | 359/783 |
| 4,993,817 A | 2/1991 | Hoogland | 359/708 |
| 5,005,960 A | 4/1991 | Heimbeck | 359/435 |
| 5,059,009 A | 10/1991 | McKinley | 359/435 |
| 5,257,133 A | 10/1993 | Chen | 359/434 |
| 5,327,283 A | 7/1994 | Zobel | 359/434 |
| 5,341,240 A | 8/1994 | Broome | 359/435 |
| 5,359,453 A | 10/1994 | Ning | 359/434 |
| 5,412,504 A | 5/1995 | Leiner et al. | 359/434 |
| 5,416,634 A | 5/1995 | Ning | 359/434 |
| 5,444,569 A | 8/1995 | Broome | 359/434 |
| 5,625,488 A | 4/1997 | Dietzsch et al. | 359/434 |
| 5,633,754 A | 5/1997 | Hoogland | 359/435 |
| 5,731,916 A | 3/1998 | Ono | 359/434 |
| 5,841,578 A | 11/1998 | Hoogland | 359/434 |
| 5,933,275 A | 8/1999 | Igarashi | 359/435 |
| 6,545,802 B2 | 4/2003 | Hoogland | 359/435 |

FOREIGN PATENT DOCUMENTS

| | | |
|---|---|---|
| EP | 558 278 A1 | 3/1994 |
| FR | 1450280 | 8/1966 |
| GB | 2 267 762 A | 12/1993 |
| JP | 63 0301015 | 12/1988 |
| WO | WO 92/19008 | 10/1992 |

OTHER PUBLICATIONS

U.S. Appl. No. 09/511,662, filed Feb. 23, 2000.
S. J. Dobson and J.Ribero, "*The primary aberration characteristics . . . of common relay systems*", Meas. Sci. Technol.5 (1994) pp. 32–36.
M. Thomas, *Ninendo surgery*, Optics and Phot. News Jul. 1994 pp. 6–7.

*Primary Examiner*—Thong Q Nguyen
(74) *Attorney, Agent, or Firm*—Knobbe, Martens, Olson & Bear, LLP

(57) ABSTRACT

Optical systems (1–19) for endoscopes and the like are characterized by an integrated design in which the locations of the components and the aberration corrections are no longer tied to the optical functions of the objective (1–6) and the relays (7–19), and in which the relays may depart from symmetry. The power requirements can thus be shifted from one group to another, thereby reducing the overall power requirement. Moreover, the aberration correction can be shared between the optical group of the integrated system.

25 Claims, 10 Drawing Sheets

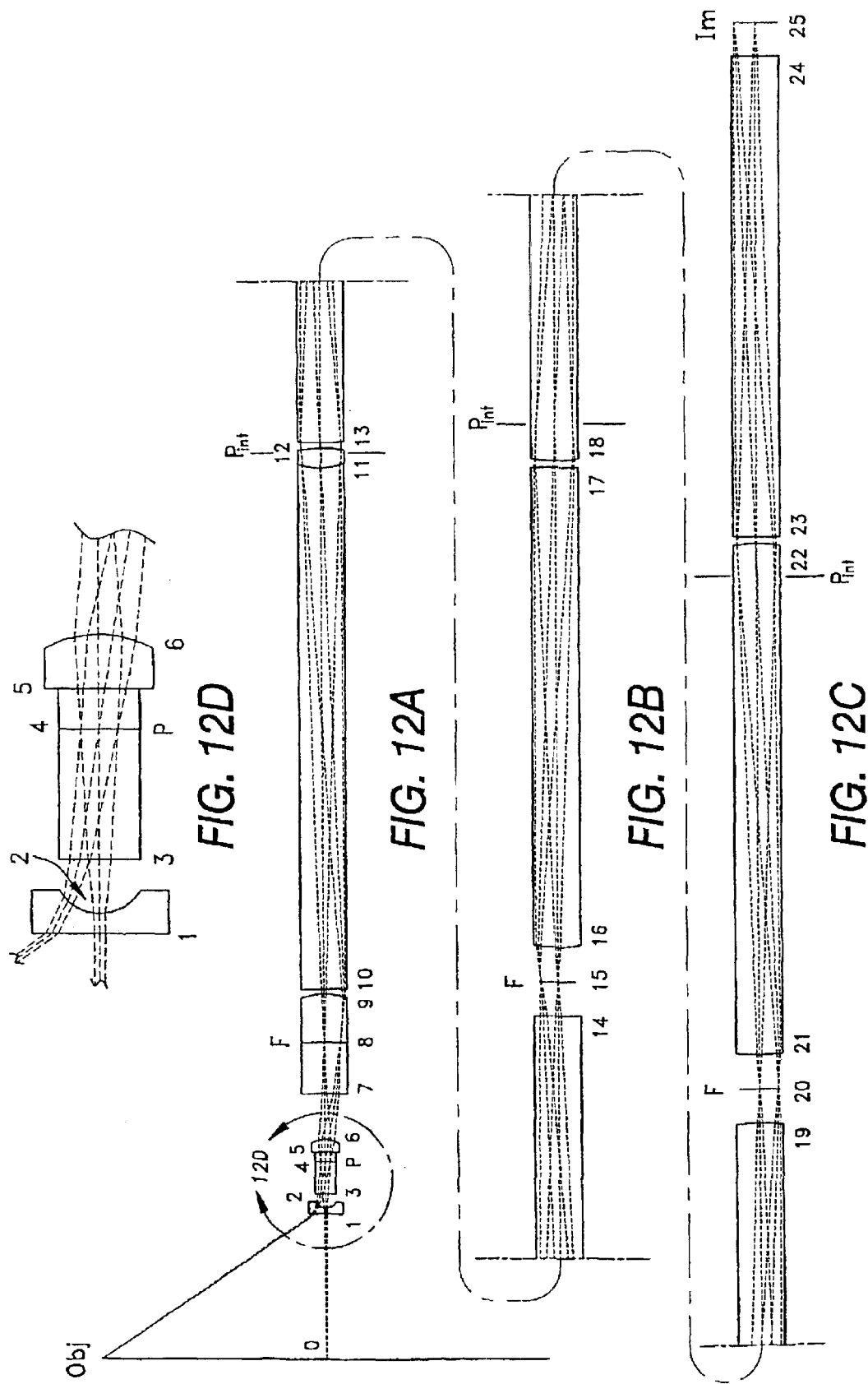

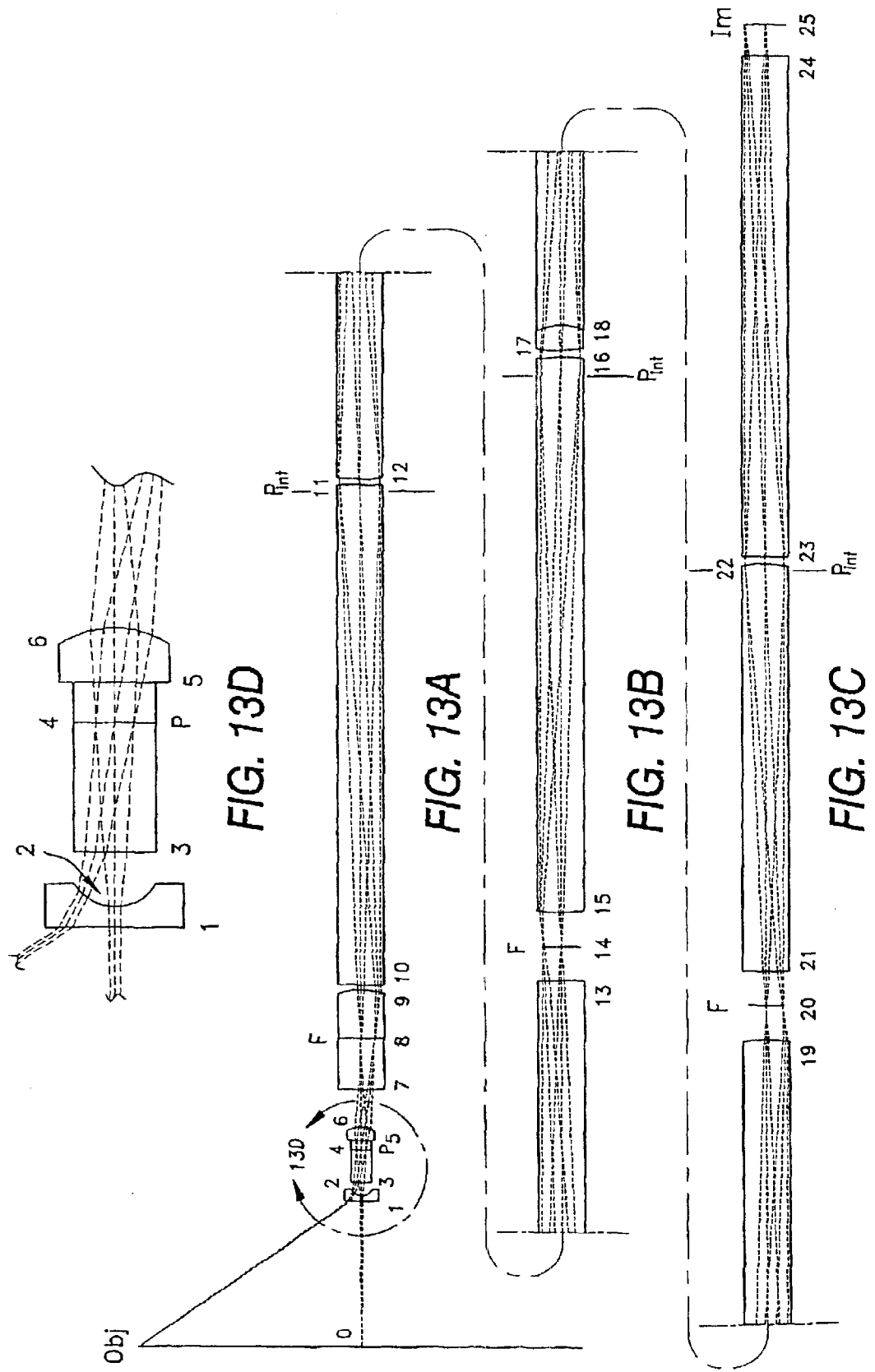

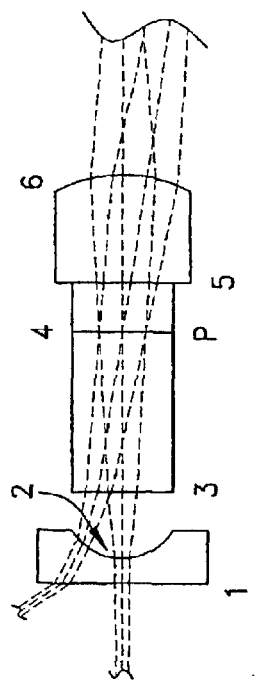
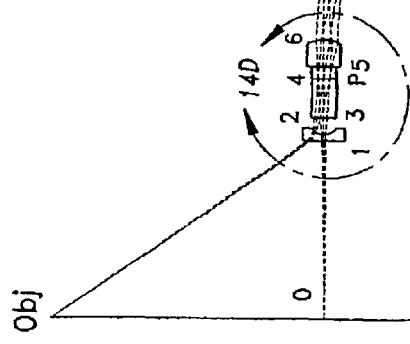
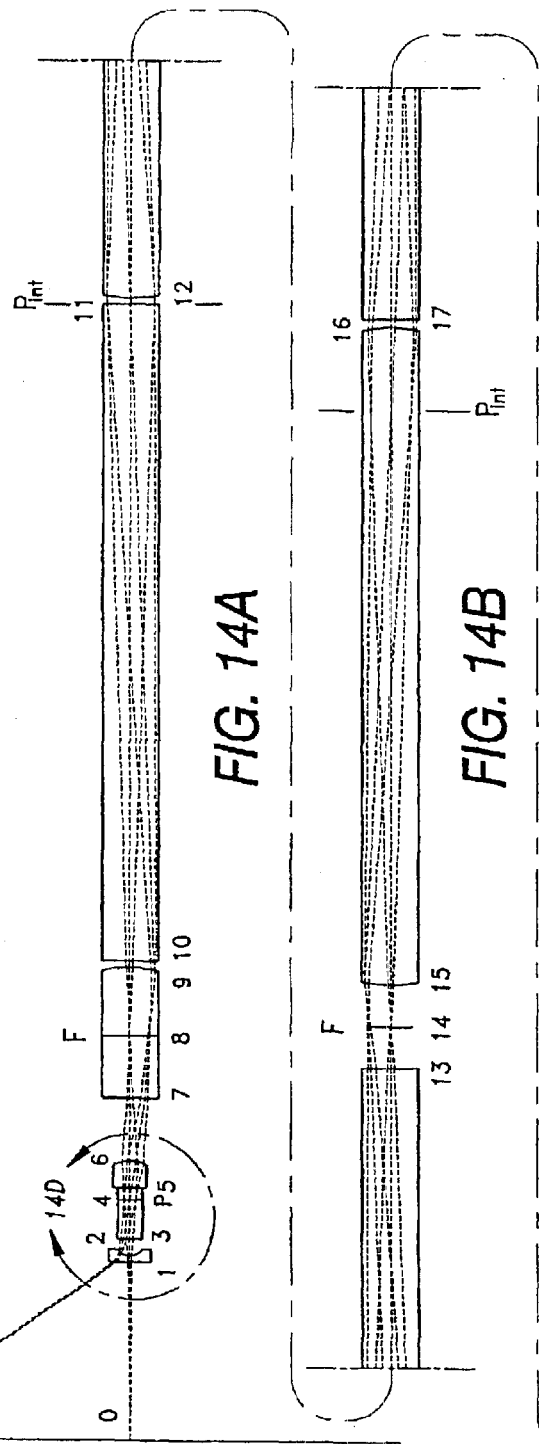
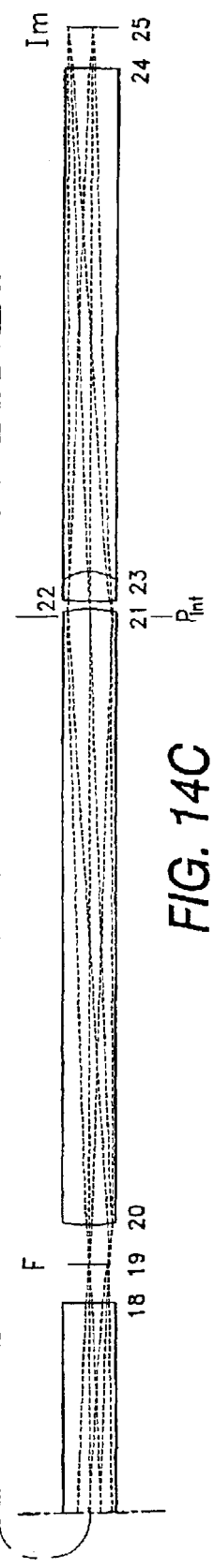
FIG. 14D
FIG. 14A
FIG. 14B
FIG. 14C

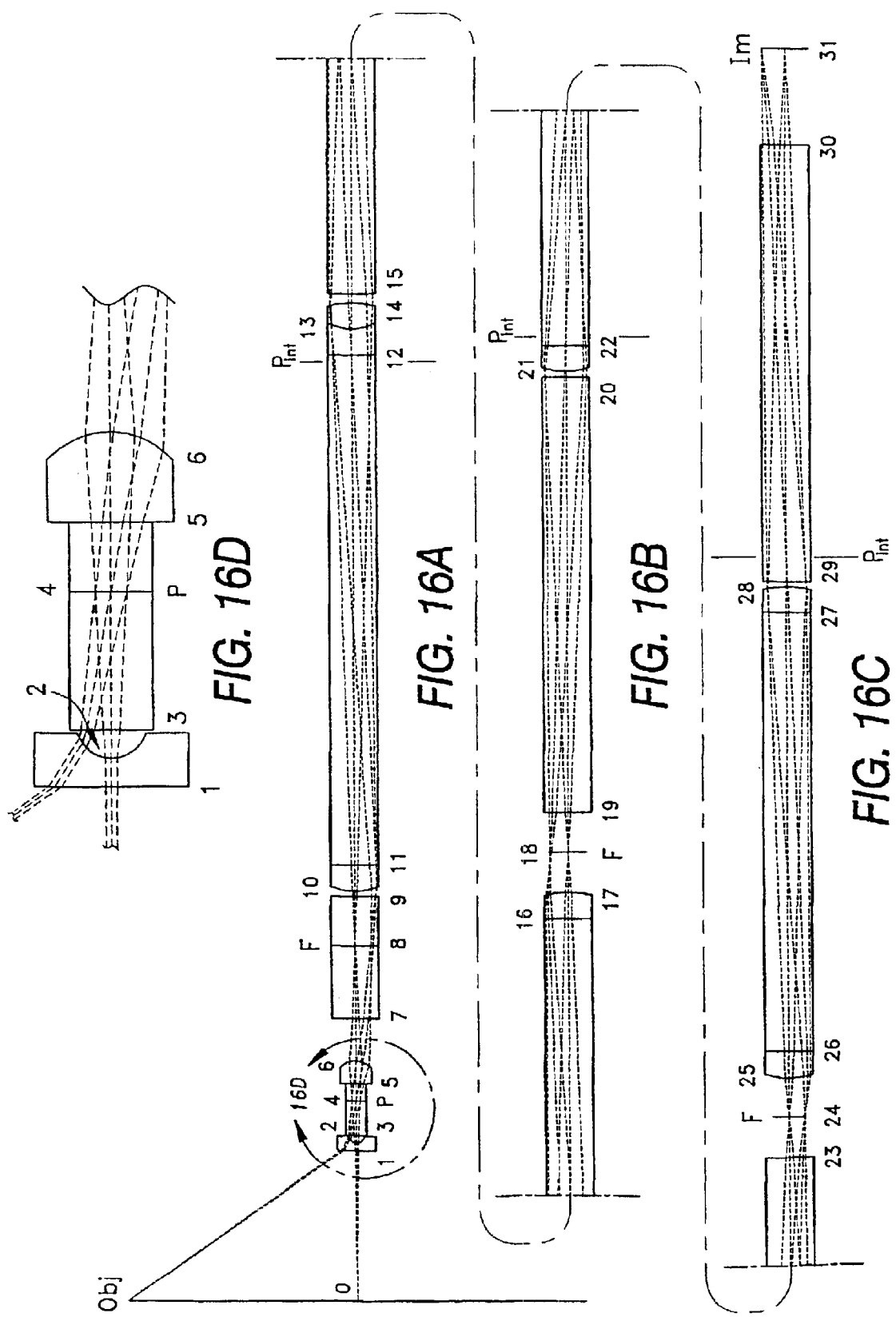

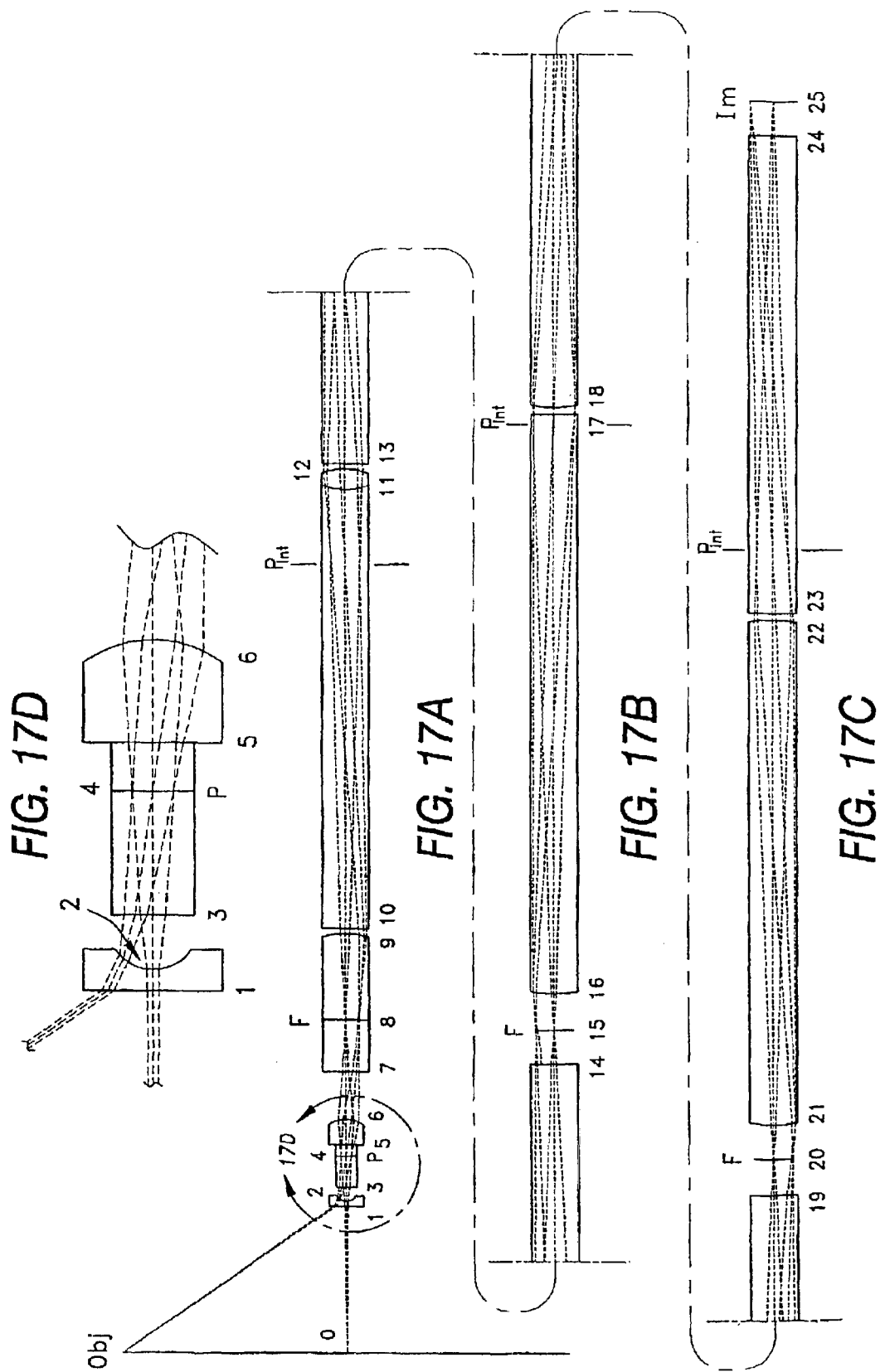

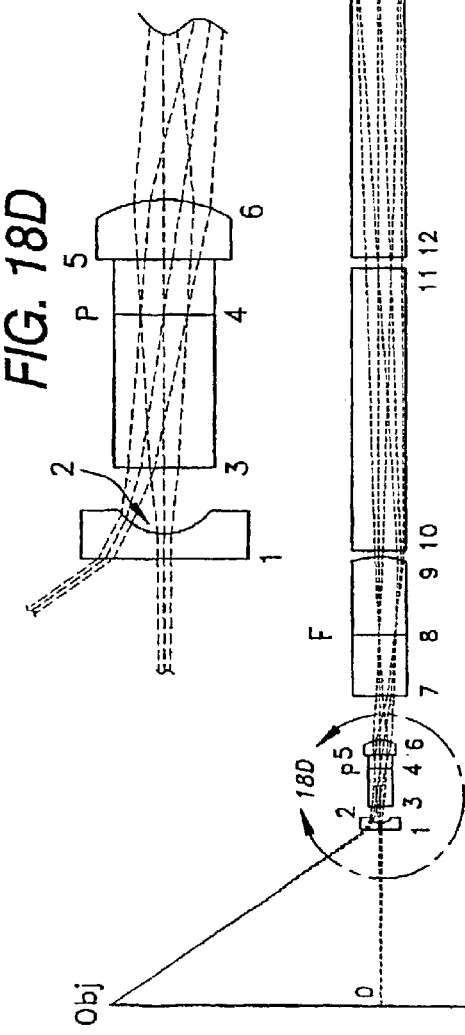
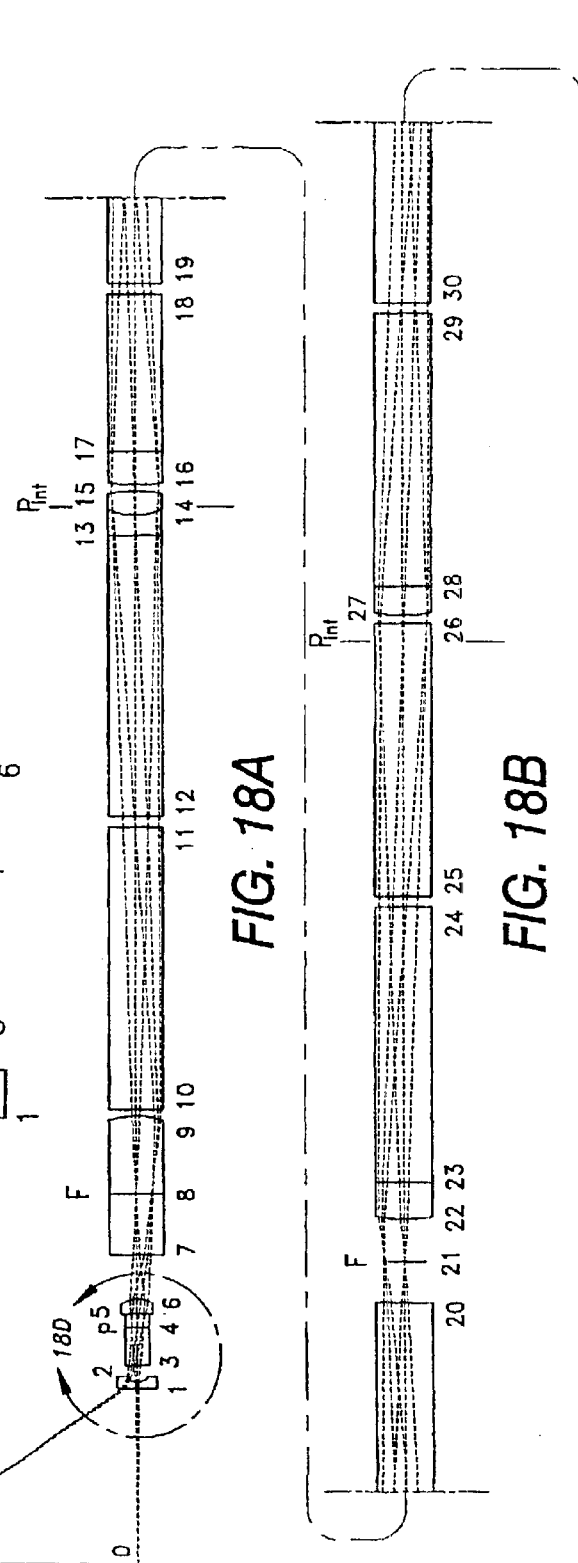
FIG. 18D
FIG. 18A
FIG. 18B
FIG. 18C

INTEGRATED OPTICAL SYSTEM FOR ENDOSCOPES AND THE LIKE

This application is a national phase application under Section 371 of International Application PCT/US01/06084, which is a continuation-in-part of U.S. application Ser. No. 09/511,662, filed Feb. 23, 2000, now abandoned, which is a continuation of U.S. application Ser. No. 09/197,590, filed Nov. 23, 1998, now U.S. Pat. No. 6,545,802, which is a continuation of U.S. application Ser. No. 08/687,910, filed Jul. 30, 1996, now U.S. Pat. No. 5,841,578, which is a continuation of U.S. application Ser. No. 08/351,481, filed Dec. 6, 1994, now U.S. Pat. No. 5,633,754.

FIELD OF THE INVENTION

The present invention relates generally to optical lens system, and more particularly to lens systems suitable for endoscopes and the like.

BACKGROUND OF THE INVENTION

In endoscopy and related fields, such as borescopes and dental scopes, the complete optical system is thought of as consisting of four basic and separate optical functions. Those functions are, in sequence of the direction of the travelling light, as follows:

(1) an objective which forms the first image of an object under surveillance, (2) a field lens which images the pupil of the objective onto the next image transfer lens, (3) an image transfer lens which reimages the first image onto the next field lens. The pupil and image transfer steps are repeated as often as is needed to obtain a desired tube length, and (4) a focusing lens which presents the final image to a sensor, such as a person's eye, a CCD camera, or a photographic film.

This approach is the classical approach, which is appropriate for the following reasons:

(1) The design of the optical system is broken up into parts with single and clearly defined and separate functions, functions to each of which an optical designer may bring considerable experience.

(2) The light transfer capacity and information transfer capacity of an endoscope is at a maximum when the optical power is concentrated at the image planes and pupil planes. The expedience of this approach is brought out by numerous U.S. patents on endoscopes which treat the objective, the relay system, and the eyepiece as separate parts of the total system.

The disadvantage of treating the different optical components as separate entities is that the distribution of the optical power is very uneven and that certain aberrations are naturally at a maximum, like astigmatism, field curvature, and chromatic aberrations. The correction of these aberrations requires relatively short radii of curvature. These short radii of curvature are difficult to fabricate, require tight tolerances, and they are therefore the main contributors to the considerable cost of the fabrication of an endoscope. A truly inexpensive endoscope, sufficiently inexpensive to be offered as a disposable item, is presently not practical with conventional designs.

SUMMARY OF THE INVENTION

Several exemplary embodiments of the present invention are disclosed which provide an integrated optical system suitable for endoscopes, borescopes, dental scopes, and the like. One aspect of the present invention is an endoscope having a reduced number of elements compared with conventional endoscopes. The elements may advantageously have relatively long radii of curvature which facilitates their mass production. Furthermore, the elements are not necessarily of a meniscus shape.

Some of the exemplary embodiments have an outside entrance pupil location (i.e., the pupil is located between the embodiment and the object to be imaged), so that they are suitable for a tapered probe (e.g., for concealment) or for accommodating a line-of-sight deviating prism on the image side of the pupil location. Other embodiments include or may be combined with a field expander, in which the pupil location may be located so as to accommodate a line-of-sight deviating prism. Further, many of the embodiments disclosed herein are highly insensitive to tilt and decentration of their components.

In several of the exemplary embodiments herein, the foregoing advantages are achieved in a lens system characterized by an integrated design in which the locations of the components may not be dictated by the optical functions of the objective and the relays. Further, the aberration correction may be advantageously distributed over two or more groups, thereby providing relief to the first group (which conventionally has the highest optical power and is in need of most of the aberration correction) and permitting the radii of curvature of the optical components to be reduced, resulting in a smaller overall power requirement (i.e., the sum of the absolute values of the powers of the optical components is smaller). In several of the exemplary embodiments disclosed herein, departure from symmetry of the relay system is employed to further the integration. It has been found that this integration of the optical functions and the aberration correction, as well as the departure from symmetry, may be very beneficial in that they greatly simply the optical system by reducing its curviness and complexity. The resulting simplicity of the optical system results in reduced costs and may permit it to be used as a disposable item.

In some embodiments described herein, a plano-convex lens or a double convex lens can be corrected for astigmatism since such a lens is displaced from the stop location. In this way, optical surfaces of very short radii of curvature may not be needed to correct the astigmatism of the total optical system. Furthermore, the spherical aberration of convex-plano lenses used in several of the embodiments herein is greatly reduced and may approach the minimum possible for a single element. In many of the embodiments herein, the chromatic aberrations may be greatly reduced compared to many conventional systems. For example, chromatic aberrations may be reduced by a factor of 2 to 4 without the presence of a chromatic aberration reducing element. Thus, in some embodiments further color correction may not be necessary.

In one embodiment, a color corrected optical endoscope system, including a plurality of elements, in accordance with the present invention comprises an objective element and relay system providing substantially all color correction for the endoscope system using at least one curved optical interface providing color correction, the objective element and the relay system optically aligned to transfer an image from an input plane of the objective element to an output planes of the endoscope system, each of the plurality of optical elements being uniformly refractive and suitable for use with at least one of the e, FN, and CN spectral lines.

Other embodiments are disclosed herein which include several transfers and can be basically fully color corrected by the use of a single color correcting element of modest optical power. Optical distortion of many kinds, which may be very high in the objective, can be corrected at more convenient end effective places, resulting in a single integrated system of greatly reduced complexity. Additional optics, like a close-up lens, a field expander, a field flattening lens, or additional relay groups, may be employed with several of the inventive embodiments disclosed herein.

Yet another embodiment of the present invention is a color corrected optical endoscope system including an optical system having a plurality of optical elements, comprising an objective element and a first relay system having a first number of curved surfaces, the first relay system including an optical interface having a curvature that provides substantially all of the color correction for the endoscope system, the objective element and the first relay system optically aligned to transfer an image from an input plane of the objective element to an output plane of the endoscope system, wherein the plurality of optical elements are suitable for use with at least a portion of the spectrum extending from the FN to the CN spectral line.

Another embodiment of the present invention is a color corrected optical endoscope including a plurality of optical elements, comprising an objective and a relay system, the relay system having at least one optical interface providing color correction for the endoscope, the objective providing substantially no color correction, the objective and the relay system aligned along a common optical axis, and the plurality of optical elements being suitable for use with at least a portion of the spectrum extending from the FN to the CN spectral line.

Still another embodiment of the present invention is a color corrected endosopic imaging system including a plurality of optical elements, comprising an objective for imaging an object onto a focal plane and at least one relay that is optically aligned with the objective along a common optical axis, the relay including curved surfaces, at least one curved interface providing color correction for the endoscopic imaging system, wherein the number of the curved surfaces in the relay is not greater than 5.

Yet another embodiment of the present invention is a color corrected imaging system for use with an endoscope and including a plurality of optical elements, comprising an objective having an optical axis and at least one relay aligned with the objective along the optical axis, the objective having not more than 3 curved surfaces, at least one of the optical elements providing color correction for the imaging system.

Another embodiment of the present invention is a color corrected endoscope including a plurality of optical elements, the endoscope comprising an objective system and at least three relay systems optically aligned with the objective system, wherein the objective system and three of the at least three relay systems together include not more than 13 curved surfaces.

Another embodiment of the present invention is a color corrected endoscope including a plurality of optical elements, the endoscope comprising an objective system and at least two relay systems including optical elements, the at least two relay systems optically aligned with the objective system, wherein the objective system and two of the at least two relay systems together include not more then 10 curved surfaces, the optical elements suitable for use with at least a portion of the spectrum extending from the FN to the CN spectral line, and at least one of the optical elements providing color correction to the endoscope.

Another embodiment of the present invention is a color corrected endoscope, including a plurality of lens elements, comprising an objective and at least one relay, wherein one of the at least one relay includes not more than 3 lens elements, the objective and the at least one relay aligned to transfer an image from an input plane of the objective to an output plane of the endoscope, at least one of the lens elements providing color correction to the endoscope.

Another embodiment of the present invention is a color corrected endoscopic system including a plurality of optical elements, comprising an objective group and at least two relay groups aligned with the objective group along an optical axis, one of the relay groups including no optical elements of negative optical power, and another of the relay groups providing color correction to the endoscopic system.

Another embodiment of the present invention is a color corrected endoscopic system including a plurality of optical elements, comprising an objective and at least one relay group aligned with the objective along an optical axis, the objective and the at least one relay group together including not more than 2 elements of negative optical power, at least one of the plurality of optical elements providing color correction for the endoscopic system.

Another embodiment of the present invention is a color corrected optical endoscope including a plurality of optical elements, comprising means for forming a first image of an object and means for relaying the first image and forming a second image, wherein the relaying means includes means for correcting chromatic aberrations, whereas the means for forming a first image includes substantially no means for correcting chromatic aberrations, the means for forming a first image and the relaying means being aligned along a common optical axis, the plurality of optical elements being suitable for use with at least a portion of the spectrum extending from the FN to the CN spectral line.

Another embodiment of the present invention is an optical system including a plurality of optical elements, comprising an objective a color-correcting relay providing substantially all color correction for the system using at least one curved interface providing color correction and a non-color correcting relay, wherein the non-color correcting relay, the objective, and the color-correcting relay are aligned along a common optical axis and optically aligned to transfer an image from an input plane of the objective to an output plane of the optical system, in which each of the plurality of optical elements is uniformly refractive and suitable for use with at least a portion of the spectrum extending from the FN to the CN spectral line Another embodiment of the present invention is a method of imaging an object, comprising forming a first image of the object with a non-color correcting objective system providing at least a first and a second relay system, aligning the objective system and the first and second relay systems along a common optical axis, receiving the first image from the objective system with the first relay system to form a second image, transferring the second image from the first relay system using the second relay system to form a third image of the object and correcting chromatic aberrations with one of the relay systems by using at least one optical interface, wherein the objective system and the plurality of relay systems are suitable for use with at least a portion of the spectrum extending from the FN to the CN spectral line.

Another embodiment of the present invention is a method of imaging an object, comprising providing an objective for forming a first image of the object, providing at least three relay systems optically aligned with the objective system, wherein the objective and the relay systems together include not more than 13 curved surfaces, the objective and the relay systems being suitable for use with at least a portion of the spectrum extending from the FN to the CN spectral line, receiving the fist image with one of the relay systems, forming an output image with another of the relay systems, in which the output image can be received by a viewer and providing color correction to the output image with at least one curved interface.

Another embodiment of the present invention is a method of designing an integrated aberration corrected endoscope, comprising providing a plurality of optical groups, wherein the groups are aligned along a common optical axis and each of the groups produces a respective image at a respective focal plane, the groups including an objective and at least one relay and providing a first one of the groups with more aberration correction than the first group requires to be aberration corrected, and providing a second one of the groups with less aberration correction than the second group requires to be aberration corrected, wherein the aberration correction of the first group compensates for lack of aberration correction in the second group to produce an aberration corrected endoscope.

Another embodiment of the present invention is an integrated aberration corrected endoscope, comprising a first optical group, the first group having more aberration correction than the first group requires to be aberration corrected and at least a second optical group, the second group having less aberration correction than the second group requires to be aberration corrected, in which the aberration correction of the first group compensates for lack of aberration correction in the second group to produce the integrated aberration corrected endoscope, wherein the groups are aligned along a common optical axis and each of the groups produces a respective image at a respective focal plane, the groups including an objective and at least one relay.

Another embodiment of the present invention is an optical system for transferring an image from a first plane to a second plane via an intermediate plane, comprising an objective comprising at least one optical element disposed between the first plane and the intermediate plane for forming a relatively uncorrected image at the intermediate plane and a relay comprising at least one optical element disposed between the intermediate plane and the second plane for forming a relatively more corrected image at the second plane.

BRIEF DESCRIPTION OF THE DRAWINGS

FIGS. 12A–12C provide an optical schematic view of an eleventh embodiment of the present invention which includes three image relays, with the color correction basically being performed by a single element in the first optical relay.

FIG. 12D is an enlarged view of the objective of FIG. 12A.

FIG. 13A–13C provide an optical schematic view of a twelfth embodiment of the present invention which includes three image relays, with the color correction basically being performed by a single element in the second optical relay.

FIG. 13D is an enlarged view of the objective of FIG. 13A.

FIG. 14A–14C provide an optical schematic view of a thirteenth embodiment of the present invention which includes three image relays, with the color correction basically being performed by a single element in the third optical relay.

FIG. 14D is an enlarged view of the objective of FIG. 14A

FIG. 16A–16C provide an optical schematic view of a fifteenth embodiment of the present invention which includes three image relays that comprise plastic elements.

FIG. 16D is an enlarged view of the objective of FIG. 16A.

FIG. 17A–17C provide an optical schematic view of a sixteenth embodiment of the present invention which includes three image relays that comprise glass molded elements.

FIG. 17D is an enlarged view of the objective of FIG. 17A.

FIGS. 18A–18C provide an optical schematic view of a seventeenth embodiment of the present invention which includes three image relays, in which plano-plano interfaces divide the image relays into segments so that the endoscope is less susceptible to breakage when bent.

FIG. 18D is an enlarged view of the objective of FIG. 18A.

DETAILED DESCRIPTION OF THE PREFERRED EMBODIMENTS

Exemplary embodiments 1–11, corresponding to FIGS. 2–12 described below, are standardized such that the objective and the first relay have a length of about 100 millimeters, and most have a nominal magnification of unity. In this way, the performance of Embodiments 1–11 can be conveniently compared. Embodiments with other magnifications, fields of view, numerical apertures, and with additional relays are presented in order to show that the general concept of the invention is effective over a wide range of applications. The embodiments described herein (1–18) use conventional, non-GRIN (gradient refractive index) lens elements, and thus each lens has a uniform refractive index, though other lens types may be used as well.

In FIGS. 1–18, the object and image planes are indicated by an 'Obj' and 'Im,' respectively. Intermediate focal planes and pupil planes are indicated at various points in the optical train by an 'F' and a '$P_{int}$', respectively. Optical system features of the object plane ("surface 0" in FIGS. 1–18), the first pupil plane (or stop, corresponding to "surface 1" in FIGS. 1–11 and "surface 4" in FIGS. 12–18), lens surfaces, and the final image plane are numbered sequentially. Note that in FIGS. 1–11, the entrance pupil $P_{ent}$ and the stop are coincident, though in other embodiments, they may be displaced from one another. The propagation of marginal and chief rays is indicated throughout the figures with hashed lines.

Tables 1–18 present the construction parameters of the embodiments illustrated in FIGS. 1–18. Table 1 refers to the system shown in FIG. 1, Table 2 to the system of FIG. 2, and so on for the other tables and figures. The first column indicates the surface number ("SURF" ) shown in the figures, the second column indicates the radius of curvature ("RD") of the surface, and the third column indicates the axial separations ("TH"). The optical component materials ("MEDIUM") are presented in the fourth column. As is customary, air is the implied medium of propagation when no medium is explicitly indicated. The fifth column provides the diameters ("DIAMETER") of the respective components, object, pupil, or image. With respect to Embodiments 12–18, the clear aperture is advantageously limited to a diameter of 2.5 mm, as indicated in Table 20, though in other embodiments the clear aperture may be greater. The aspheric data are presented in the sixth column. The conic constant ("CC") is defined and discussed below in connection with equation (1). The surface and plane numbers ip Tables 1–18 refer to those in the figures. The refractive indices (with respect to the e, F, and C spectral lines), the dispersion, and the preferred manufacturers of the various optical component materials disclosed herein are presented in Table 19. Optical performance parameters for Embodiments 1–18 are indicated in Table 20.

Figure 1:
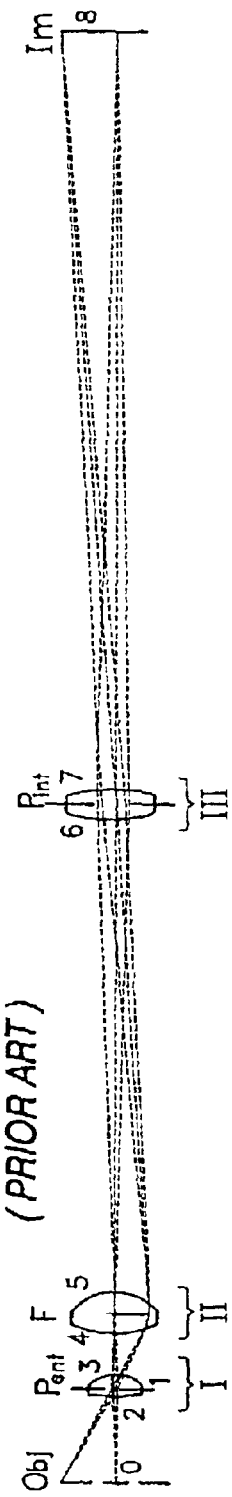
FIG. 1 is an optical schematic view of an endoscope constructed in accordance with a conventional layout in which each component has a single function in the system.

FIG. 1 is an optical schematic of an endoscope system which is constructed in accordance with the classical, conventional, concept of separation of the various functions. Group I is an objective which contains the entrance pupil plane ($P_{ent}$), while Group II represents a field lens which is located at the focal plane of the objective (F). Group III represents a transfer lens which transfers the image formed by the objective onto a subsequent focal plane (here, the image plane, Im). All groups are located at pupil planes or local planes. It is apparent from FIG. 1, as well as from the radii of curvature data of Table 20, that the distribution of optical power is very uneven. The value of the sum of the absolute values of the curvatures, which is a measure of difficulty of fabrication, is 1.62/mm (see column 5 of Table 20) for this prior art embodiment, which is uncorrected for chromatic aberrations. If this embodiment were corrected for chromatic aberrations, the sum of the absolute values of the curvatures would more than double. This would be disadvantageous, since, in general, the greater the sum of the absolute values of the curvatures, the higher the manufacturing costs. The pertinent performance data are listed in Table 20, and the construction parameters are listed in Table 1.

Figure 2:
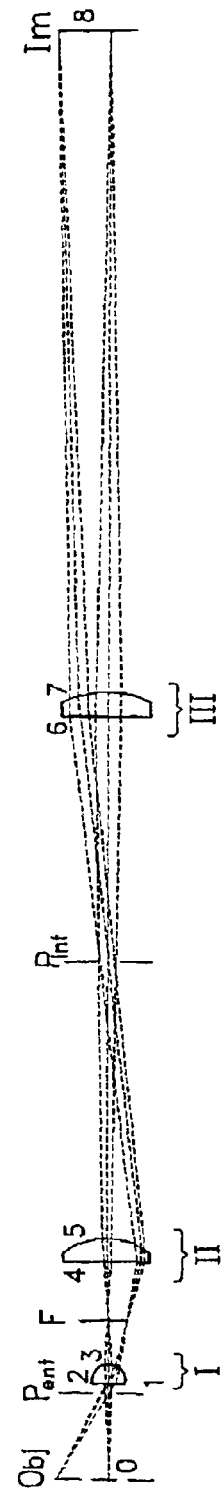
FIG. 2 is an optical schematic view of a first embodiment of the present invention in which the entrance pupil is located outside the first group by a relatively small distance.

FIG. 2 illustrates one embodiment of the present invention, which is an endoscope using a very small number of components. This design shows that by allowing the locations of the pupils and the intermediate image to depart modestly from their classical positions (cf. FIG. 1), the sum of the absolute values of the curvatures (SC) can be reduced to 1.15/mm (from 1.62/mm as in Embodiment 1—see Table 20) while still improving optical performance (eg., the peak to valley wavefront distortion is only 0.32 waves, compared with 0.79 waves in Embodiment 1—see Table 20). Only three plastic elements having a nonmeniscus shape and devoid of steep curves are needed to provide diffraction-limited performance for the monochromatic aberrations. A cone-shaped tip can be included in many applications, such as those which do not have a line-of-sight deviating prism. Such a tip may be advantageously used as a probe to reduce any disturbances to the object being examined or to reduce the exposure of the embodiment itself. The pertinent performance data are listed in Table 20, and the construction parameters are listed in Table 2.

Figure 3:
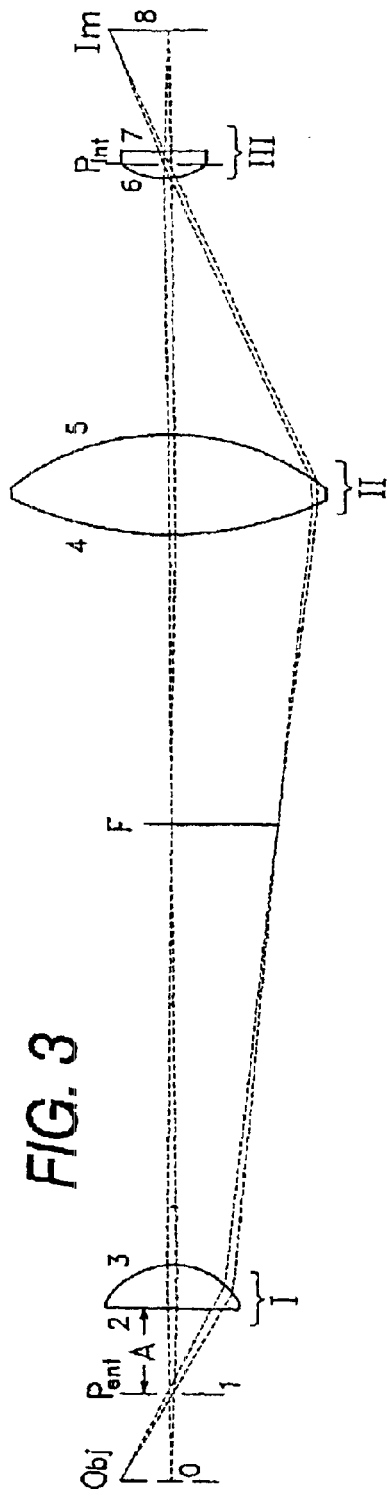
FIG. 3 is an optical schematic view of a second embodiment of the present invention in which full advantage of the power reduction and aberration reduction is taken by locating the entrance pupil outside the first group by a large distance.

FIG. 3 is an optical schematic of another embodiment of the present invention. This endoscope also uses few components and is simple in construction, but is nevertheless highly corrected for aberrations, including chromatic aberrations, with the maximum axial chromatic (wavefront) aberration being only 0.21 waves (see column 23 of Table 20). Although no negative element has been added to correct chromatic aberrations, the axial chromatic aberration is more than a factor four smaller than in the classical layout (0.90 waves, cf. FIG. 1 and Table 20) and is within the diffraction limit. Thus, this example shows the advantage of a redistribution of power, which in this example is related to the attendant shift of pupil ($P_{int}$). While Embodiment 3 departs even further from the classical layout than does Embodiment 2, the SC is only 0.55, and the peak-to-valley wavefront aberration has been reduced to 0.21 waves (see Table 20).

Figure 4:
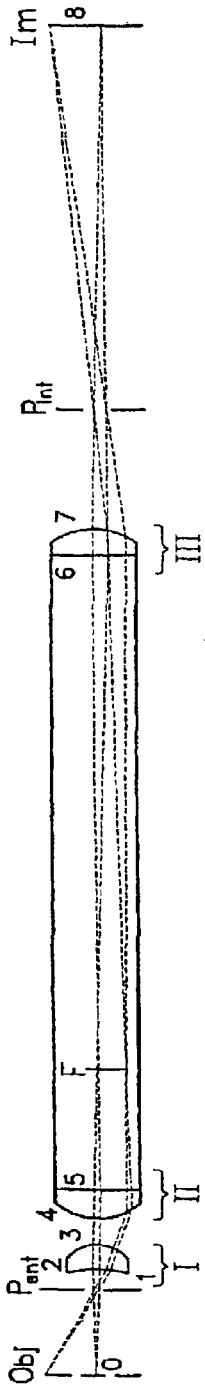
FIG. 4 is an optical schematic view of a third embodiment of the present invention which incorporates a rod-shaped element.

FIG. 4 is an optical schematic of an endoscope which consists of two components. The second and third groups II, III are cemented to a rod-shaped element so that there are only four glass/air surfaces. Despite the relatively few elements of this embodiment, aberrations are at the diffraction limit. For example, the peak-to-valley wavefront aberration is only 0.27 waves, and the maximum axial chromatic aberration is only 0.31 waves, as indicated in Table 20. This example shows that rod-shaped elements can be beneficially employed in the present invention. The advantage of using a rod-shaped element is that the optical distance from the object to the image plane is increased without increasing the diameter of the optical system. This embodiment also demonstrates that rod-shaped elements may alter the location of the intermediate pupil plane ($P_{int}$) and focal plane of the objective (F), which have now moved beyond the third (III) and second (II) groups, respectively. A shorter rod-shaped element can put the intermediate focal and pupil planes (F and $P_{im}$) at the second (II) or third (III) element if so desired, While some of the embodiments of the present invention do not require. meniscus-shaped optical elements, their incorporation is not precluded, as is shown in this example. The gain in using meniscus shapes, however, may be modest.

Figure 5:
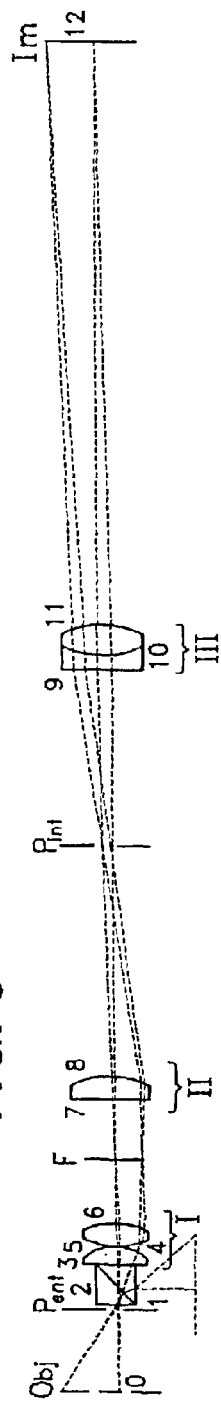
FIG. 5 is an optical schematic view of a fourth embodiment of the present invention which is made of all glass elements and which incorporates a single negative element that provides chromatic aberration correction for the illustrated system.

FIG. 5 is an optical schematic of an endoscope which is constructed entirely of glass elements, none of which is meniscus-shaped. In other embodiments, plastic lenses may be used in addition to or in place of the glass elements, as illustrated in other exemplary embodiments. The curvatures are shallow and spherical with all but one of the surfaces having radii of curvature greater than 8 mm. The first group I easily provides the needed space for a line-of-sight deviation prism (which includes surfaces 2 and 3) between the entrance pupil $P_{ent}$ and the first group (I), even though the field of view is relatively large (70 degrees). It is important to note that, despite the fact that the first group (I) is not color corrected in any way, the chromatic aberration of the whole system is basically fully corrected the maximum axial chromatic aberration is only 0.12 waves—see Table 20) at surface 10 by means of a single negative element, although additional color correction can be provided, and additional negative elements can be used. The three groups (I, II, III) are fully integrated but are far removed from the objective focal plane (F) and the intermediate pupil plane ($P_{int}$).

Figure 6:
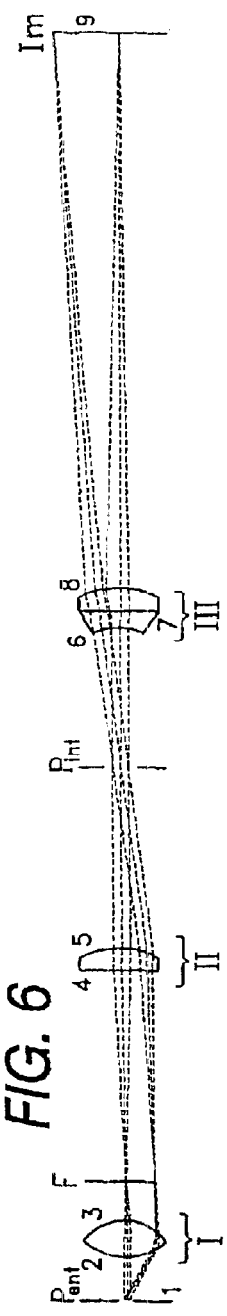
FIG. 6 is an optical schematic view of a fifth embodiment of the present invention which is a simple glass and plastic system that basically fully corrects for chromatic aberrations.

FIG. 6 is an optical schematic of an endoscope which is constructed partly of glass and partly of plastic, demonstrating how lenses of different materials can be combined in a single endoscope. Again, no steep curves or meniscus elements are needed to achieve the relatively high numerical aperture (N.A.) of 0.025, although such elements may be used. The distortion is well corrected, with the maximum image distortion being only 0.3% (see Table 20). The object has been set at infinite distance to show that the basic design is not affected by a change in magnification as is generally the case with endoscopes. The color correction is basically provided by surface 6.

Figure 7:
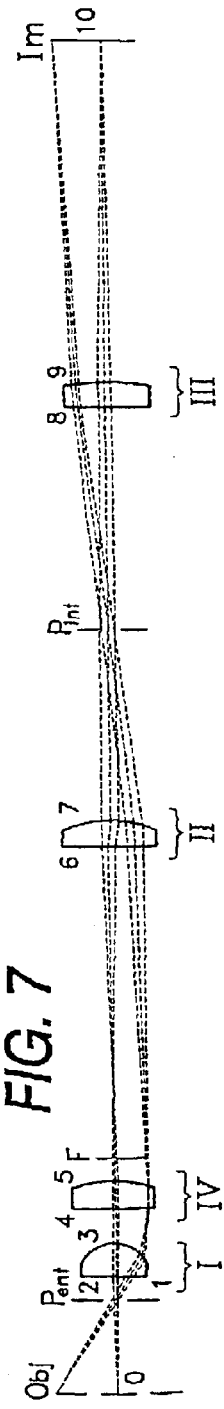
FIG. 7 is an optical schematic view of a sixth embodiment of the present invention in which the three basic groups have been augmented with an element near the focal plane of the first group.

FIG. 7 is an endoscope to which an additional group of optical power (IV) has been added, resulting in a modestly improved monochromatic performance. The added element IV is positioned dose to the image plane (F) of the objective where element IV is most effective. The relatively weak power of element IV (which is positive) shows that most of the burden of the optical functions, as well as the aberration corrections, are performed by the groups I, II, and III, which are displaced from the image planes and pupil planes. This example shows that an additional element near an image plane or a pupil plane can be used with the present invention.

Figure 8:
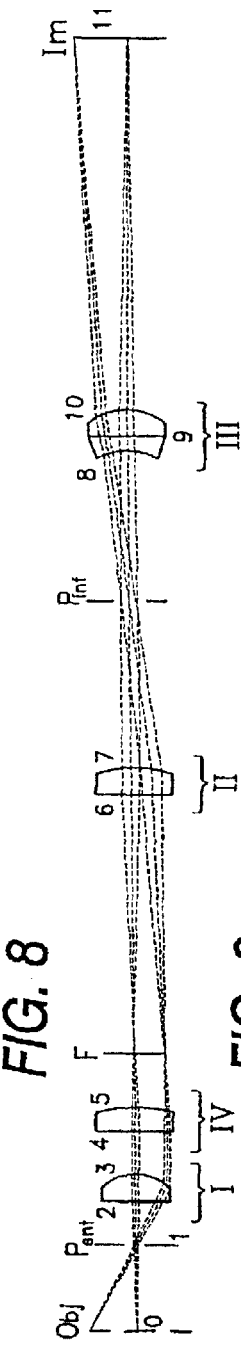
FIG. 8 is an optical schematic view of a seventh embodiment of the present invention in which a fourth group (IV) of low optical power has been added near the focal plane of the first group (F), the fourth group containing a single negative element for correcting the chromatic aberrations.

FIG. 8 is a highly corrected endoscope using plastic elements with a relatively high N.A. of 0.025. Only one of the elements, element IV, is preferably positioned close to an image or pupil plane but is again of low optical power. Although four optical elements are used, the SC is still only 1.06 and the maximum axial chromatic aberration is only 0.31 waves. The color correction is basically provided by surface 8.

Figure 9:
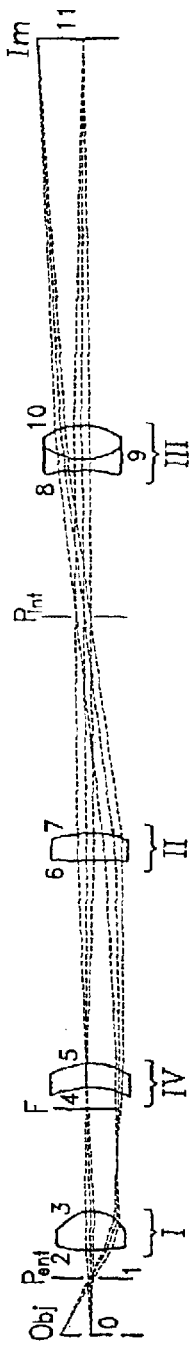
FIG. 9 is an optical schematic view of an eighth embodiment of the present invention which incorporates a meniscus shaped element.

FIG. 9 is an endoscope similar to the one shown in FIG. 8. The magnification has been increased to 2×, showing that the design remains very similar to the 1× and 0× designs, as is generally the case with endoscopes. Again, a meniscus element has been employed to show that despite the fact that the present invention can be used with nonmeniscus elements, their employment is by no means excluded. In this embodiment, the fourth group (IV, the meniscus element) is of negative power, again showing that the fourth element is a nonessential addition to the other three groups of the invention. The color correction is basically provided by surface 9.

Figure 10:
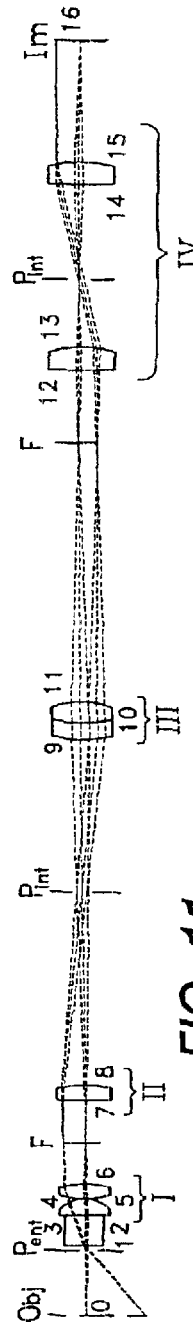
FIG. 10 is an optical schematic view of a ninth embodiment of the present invention which incorporates a second image relay and basically fully corrects for chromatic aberrations with a single element of negative optical power.

FIG. 10 is an endoscope in which a second relay (designated as group IV) is used. This embodiment has a very large field of view of 80 degrees and a relatively high N.A. of 0.025. Despite these large values, a deviation prism (which includes surfaces 2 and 3) can be readily accommodated between the objective (I) and the entrance pupil ($P_{ent}$), as shown in FIG. 10. The total system is still very well corrected at surface 10 by a single color correcting element of low power, which basically provides full correction of the chromatic aberrations, e.g, the maximum axial chromatic aberration is only 0.35 waves (see Table 20). As the first three groups (I, II, III) are together fully correctable, the addition of classical relays to those first three groups is not excluded.

Figure 11:
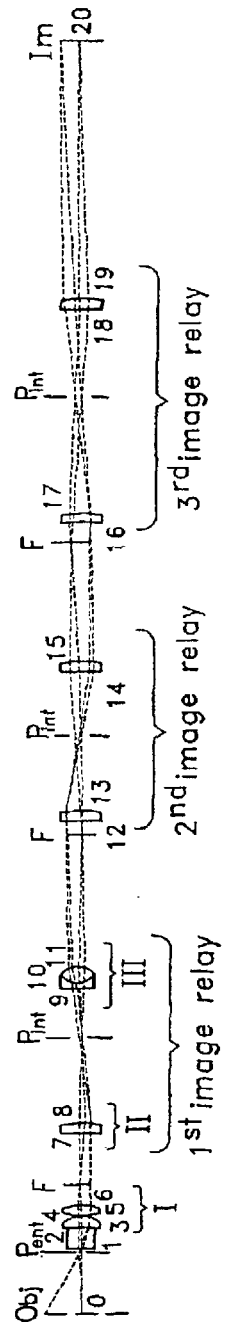
FIG. 11 is an optical schematic view of a tenth embodiment of the present invention which incorporates a third image relay while still basically fully correcting for chromatic aberrations using only one element of negative optical power.

FIG. 11 shows an endoscope having three image relays that is still very well corrected, with a maximum axial chromatic aberration of only 0.04 waves (see Table 20). Again, the chromatic aberrations are basically fully corrected at surface 10 with a single element of negative optical power, though additional elements may be used. In other embodiments, additional color correcting elements, may be required. In FIG. 11 the optical power of the color correcting element, even though it provides basically the full color correction, approaches a value comparable to those of the other components. In particular, surfaces 9 and 10 have radii of curvature of 50 mm and 4.5 mm, respectively. The elements are of glass, and no aspheric surfaces are employed.

FIGS. 12–18, corresponding to Tables 12–18, show exemplary embodiments of the present invention in which a field expander (corresponding to surfaces 1–2 in each of FIGS. 12–18) has been included in or with the objective (corresponding to surfaces 1–6 in each of FIGS. 12–18). In these embodiments, the field expander permits a large field of view (110 degrees) to be imaged and may also correct for the field curvature (with the Petzvalsum being correspondingly smaller). Embodiments 12–18 include a 3 relay system with the lengths indicated in Tables 12–18 corresponding to a system that can be used in medical applications. In Embodiments 12–18, a single color correcting element basically provides all the color correction.

FIGS. 12A–D illustrate an embodiment which has only 10 lens elements, 12 curved surfaces, and a sum of the absolute values of the curvatures of the optical elements equal to 3.65/mm (see Table 20). These values represent a significant improvement as compared with conventional systems, which may contain 30–35 optical elements and have a correspondingly higher sum of the absolute values of the curvatures. As indicated in Table 20 and as discussed below, these design advantages are also reflected in Embodiments 13–18. In FIG. 12A, the first relay extends between "surface 8" and surface 14. In FIG. 12B, the second relay extends between surfaces 16 and 19, and in FIG. 12C, the third relay extends between surfaces 21 and 24. The color correction in Embodiment 12 is performed by the first transfer or relay, and in particular, at surface 11. The optical performance of the system is quite good, with the peak-to-valley wavefront aberration and the maximum axial chromatic aberration being 0.34 and 0.22 waves, respectively.

The embodiment of FIGS. 13A–D is similar to that of embodiment 12; however, the second relay rather than the first relay is now the color correcting relay, with basically all of the color correction in the system being performed at optical surface 18. Further, the color correction is performed in the second half of the color correcting relay, in contrast with the embodiment of FIGS. 12A–D, in which the color correction is performed in the first half of the color correcting relay. Thus, the color correction may be placed in any group of elements.

In FIG. 13A, the first relay extends between "surface 8" and surface 13. In FIG. 13B, the second relay extends between surfaces 15 and 19, and in FIG. 13C, the third relay extends between surfaces 21 and 24. The optical performance of the system is quite good, with the peak-to-valley wavefront aberration and the maximum axial chromatic aberration being 0.32 and 0.19 waves, respectively.

In the embodiment of FIGS. 14A–D, the color correcting surface (surface 23) has been moved to the third relay, which extends between surfaces 20 and 24 in FIG. 14A. On FIG. 14A, the first relay extends between "surface" 8 (i.e., the focal surface at the input focal plane) and surface 13, and in FIG. 14B, the second relay extends between surface 15 and surface 18.) Nevertheless, the optical performances of Embodiments 12–14 are substantially comparable, with the peak-to valley wavefront aberration and the maximum axial chromatic aberration in Embodiment 14 being 0.51 and 0.17 waves, respectively.

Figure 15A:
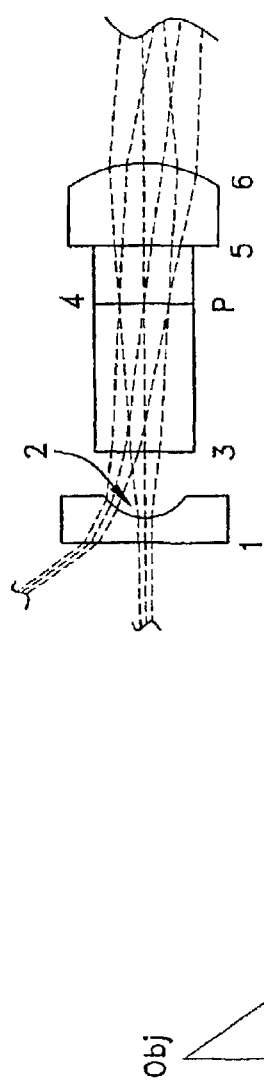
FIGS. 15A–15C provide an optical schematic view of a fourteenth embodiment of the present invention which includes three image relays but has only nine optical elements with optical power.
Figure 15B:
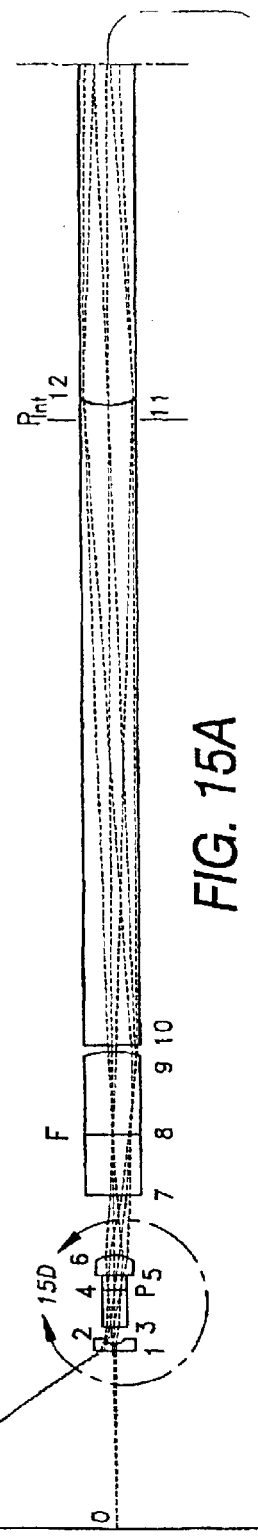
Figure 15C:
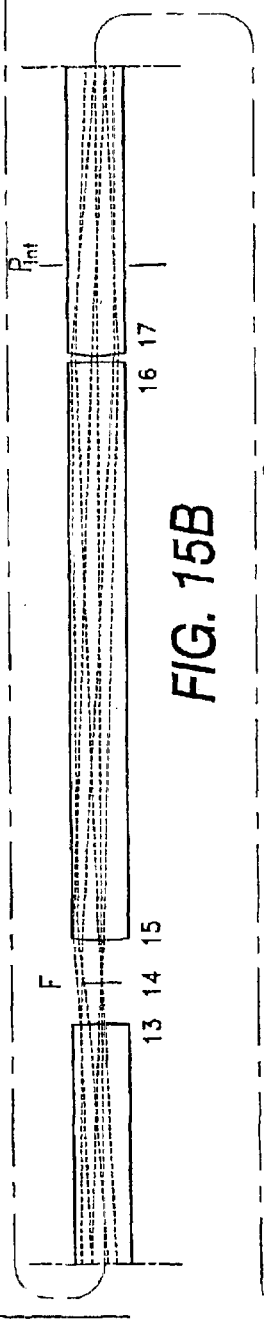
Figure 15D:
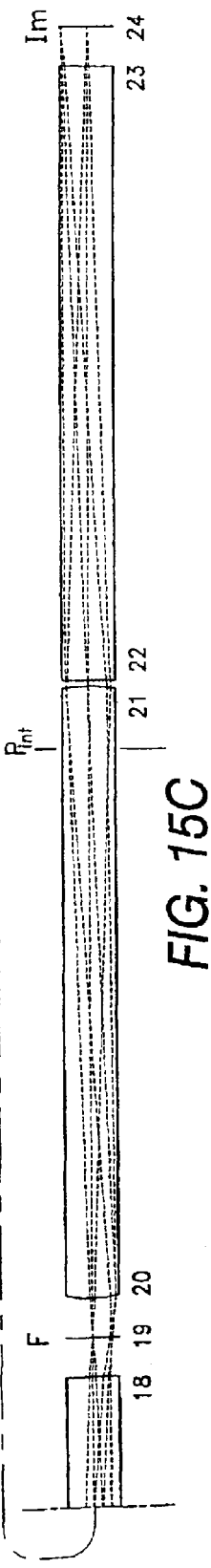
FIG. 15D is an enlarged view of the objective of FIG. 15A.

The embodiment of FIGS. 15A–D has just 9 optical elements with optical power. This design, like the other embodiments herein that include three relays, approaches the theoretical limit of 9 curved surfaces needed for a three relay endoscope. This limit is based on the fact that each relay has two or more curved surfaces and the objective has at least one curved surface. Although the maximum values of the peak to valley wavefront aberration and the maximum axial chromatic aberration in Embodiment 15 (0.81 and 0.68 waves, respectively) are higher than in the other field expander embodiments of FIGS. 12–18, the overall performance is still good, and the Petzvalsum is just 0.04/mm. In FIG. 15A, the first relay extends between "surface 8" and surface 13. In FIG. 15B, the second relay extends between surfaces 15 and 18, and in FIG. 15C, the third relay extends between surfaces 20 and 23. The color correction is basically provided by surface 11.

In the embodiment illustrated in FIGS. 16A–D, the components with curved surfaces are advantageously made of plastic, CDC, or polystyrene, which makes the components relatively inexpensive. The rods with flat surfaces can be made of glass or of plastic, or they can be molded as part of the components with the curved surfaces. However, the use of plastic materials can present special problems, e.g., the refractive index of these materials is relatively low. One approach, to combine some of the attractive features of plastic and glass, is used in this embodiment. In particular, plastic elements are cemented onto the flat faces of glass rods, resulting in an endoscope that is inexpensive but has good performance. For example, the peak-to-valley wavefront aberration is 0.41 waves, and the maximum axial chromatic aberration is 0.19 waves. In FIG. 16A, the first relay extends between "surface 8" and surface 17. In FIG. 16B, the second relay extends between surfaces 19 and 23, and in FIG. 16C, the third relay extends between surfaces 25 and 30. The color correction is basically provided by surface 13.

In the embodiment of FIGS. 17A–D, aspheric surfaces are molded into glass rods, such that the rod and lens form a single piece, thereby reducing the number of optical elements. The peak-to-valley wavefront distortion has been reduced to 0.28 wares, which is less than that of Embodiment 16, and the maximum axial chromatic aberration is only 0.28 waves. The color correction is basically provided by surface 11.

The embodiment illustrated in FIGS. 18A–D is similar to that of FIGS. 12A–D, except that the longer elements in FIGS. 12A–D have now been broken up into two shorter segments by introducing a flat-flat interface within each of the longer elements. Although this increases the number of optical pieces in the endoscope, the flexibility of the endoscope is greatly enhanced (so that the chance of the endoscope breaking during use is reduced), without diminishing the optical performance. The first optical relay is shown in FIG. 18A to extend between "surface" 8 and surface 20. The second relay (FIG. 18B) extends between surface 22 and surface 32, and the third relay extends between surface 34 and surface 43. The color correction is basically provided by surface 14.

It is thus evident from the embodiments herein that three groups (an objective, a field lens, and a relay lens) can be integrated to yield an endoscope in such a way that the sum of the absolute values of the powers of the individual optical elements is greatly reduced. The reduction in the optical power reduces the amount of aberrations to be corrected, which considerably reduces the complexity of the optical system, thereby reducing its cost. An additional and often valuable feature of some embodiments is that the entrance pupil is located outside the system, thereby facilitating the addition of other optical components such as prisms.

In Tables 1–18, the following abbreviations are used:

"CC" stands for "Conic constant," and is equal to "k" in Equation 1;

"AD" represents the aspheric constant "d" in Equation 1; and

"AE" represents the aspheric constant "e" in Equation 1.

Equation 1 below is the well-known formula for describing an aspheric surface:

$$z = \frac{c\rho^2}{\left[1 + \sqrt{1 - (k+1)c^2\rho^2}\right]} + d\rho^4 + e\rho^6 + f\rho^8 + g\rho^{10} \quad (1)$$

in which z is in the direction of the optical axis, p is the distance from the optical axis, and c is the surface curvature (1/RD). The aspheric constants f and g in the exemplary Embodiments 1–18 are equal to zero.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

TABLE 1

| SURF | RD (mm) | TH (mm) | MEDIUM | DIAMETER (mm) | CC |
|---|---|---|---|---|---|
| 0 | Infinity | 6.510 |  | 7.517 | 0.000 |
| 1 | Infinity | −0.510 |  | 0.260 | 0.000 |
| 2 | 2.600 | 1.400 | ACRYLIC | 4.000 | −52.000 |
| 3 | −1.600 | 3.000 |  | 4.000 | −7.500 |
| 4 | 4.000 | 3.000 | ACRYLIC | 6.000 | −12.000 |

TABLE 1-continued

| SURF | RD (mm) | TH (mm) | MEDIUM | DIAMETER (mm) | CC |
|---|---|---|---|---|---|
| 5 | −3.800 | 33.000 | | 6.000 | 0.000 |
| 6 | 18.000 | 2.000 | ACRYLIC | 6.000 | 0.000 |
| 7 | −24.760 | 51.640 | | 6.000 | 0.000 |
| 8 | Infinity | | | 7.473 | 0.000 |
| EFL | −5.517 | | | | |

SURF 0 = OBJECT PLANE
SURF 1 = ENTRANCE PUPIL PLANE
SURF 8 = IMAGE PLANE

TABLE 2

| SURF | RD (mm) | TH (mm) | MEDIUM | DIAMETER (mm) | CC |
|---|---|---|---|---|---|
| 0 | Infinity | 6.000 | | 6.928 | 0.000 |
| 1 | Infinity | 0.600 | | 0.240 | 0.000 |
| 2 | Infinity | 1.200 | ACRYLIC | 2.400 | 0.000 |
| 3 | −1.100 | 7.400 | | 2.400 | −0.400 |
| 4 | Infinity | 1.500 | LAH66 | 6.000 | 0.000 |
| 5 | −6.300 | 36.800 | | 6.000 | 0.000 |
| 6 | Infinity | 1.500 | ACRYLIC | 6.000 | 0.000 |
| 7 | −11.810 | 44.850 | | 6.000 | −3.000 |
| 8 | Infinity | | | 6.852 | 0.000 |
| EFL | −5.544 | | | | |

SURF 0 = OBJECT PLANE
SURF 1 = ENTRANCE PUPIL PLANE
SURF 8 = IMAGE PLANE

TABLE 3

| SURF | RD (mm) | TH (mm) | MEDIUM | DIAMETER (mm) | CC |
|---|---|---|---|---|---|
| 0 | Infinity | 6.000 | | 7.000 | 0.000 |
| 1 | Infinity | 6.000 | | 0.240 | 0.000 |
| 2 | Infinity | 3.000 | ACRYLIC | 9.200 | 0.000 |
| 3 | −4.700 | 51.300 | | 9.200 | −0.650 |
| 4 | 25.700 | 7.000 | ACRYLIC | 21.800 | 0.000 |
| 5 | −11.700 | 18.000 | | 21.800 | −2.900 |
| 6 | 7.000 | 2.000 | ACRYLIC | 6.000 | 0.000 |
| 7 | −13.477 | 6.717 | | 6.000 | −560.000 |
| 8 | Infinity | | | 7.038 | 0.000 |
| EFL | −3.217 | | | | |

SURF 0 = OBJECT PLANE
SURF 1 = ENTRANCE PUPIL PLANE
SURF 8 = IMAGE PLANE

TABLE 4

| SURF | RD (mm) | TH (mm) | MEDIUM | DIAMETER (mm) | CC |
|---|---|---|---|---|---|
| 0 | Infinity | 6.000 | | 6.928 | 0.000 |
| 1 | Infinity | 2.000 | | 0.240 | 0.000 |
| 2 | −5.000 | 1.800 | ACRYLIC | 4.400 | 0.000 |
| 3 | −2.100 | 1.700 | | 4.400 | −0.560 |
| 4 | 5.830 | 2.000 | PHM52 | 6.400 | 0.000 |
| 5 | Infinity | 48.000 | SF6 | 6.400 | 0.000 |
| 6 | Infinity | 2.000 | ACRYLIC | 6.400 | 0.000 |
| 7 | −7.010 | 36.500 | | 6.400 | −1.300 |
| 8 | Infinity | | | 6.979 | 0.000 |
| EFL | −4.845 | | | | |

SURF 0 = OBJECT PLANE
SURF 1 = ENTRANCE PUPIL PLANE
SURF 8 = IMAGE PLANE

TABLE 5

| SURF | RD (mm) | TH (mm) | MEDIUM | DIAMETER (mm) | CC |
|---|---|---|---|---|---|
| 0 | Infinity | 6.000 | | 8.402 | 0.000 |
| 1 | Infinity | 0.200 | | 0.180 | 0.000 |
| 2 | Infinity | 3.000 | LAK8 | 3.600 | 0.000 |
| 3 | Infinity | 1.500 | LAH66 | 3.600 | 0.000 |
| 4 | −4.000 | 0.200 | | 5.000 | 0.000 |
| 5 | 13.500 | 1.500 | LAH66 | 5.000 | 0.000 |
| 6 | −13.500 | 9.500 | | 5.000 | 0.000 |
| 7 | Infinity | 1.500 | LAH66 | 6.000 | 0.000 |
| 8 | −10.900 | 30.800 | | 6.000 | 0.000 |
| 9 | Infinity | 1.200 | LASF32 | 6.000 | 0.000 |
| 10 | 8.800 | 2.000 | SK5 | 6.000 | 0.000 |
| 11 | −8.470 | 42.550 | | 6.000 | 0.000 |
| 12 | Infinity | | | 7.112 | 0.000 |
| EFL | −5.492 | | | | |

SURF 0 = OBJECT PLANE
SURF 1 = ENTRANCE PUPIL PLANE
SURF 12 = IMAGE PLANE

TABLE 6

| SURF | RD (mm) | TH (mm) | MEDIUM | DIAMETER (mm) | CC |
|---|---|---|---|---|---|
| 0 | Infinity | Infinity | | 0.000 | 0.000 |
| 1 | Infinity | 3.200 | | 0.312 | 0.000 |
| 2 | 4.900 | 2.500 | ACRYLIC | 6.000 | −1.500 |
| 3 | −2.900 | 18.600 | | 6.000 | −2.500 |
| 4 | Infinity | 2.000 | ACRYLIC | 6.000 | 0.000 |
| 5 | −8.800 | 24.000 | | 6.000 | −0.700 |
| 6 | −7.000 | 1.200 | POLYCARB | 4.000 | 1.400 |
| 7 | Infinity | 2.000 | LAKN7 | 6.000 | 0.000 |
| 8 | −6.550 | 40.510 | | 6.000 | 0.000 |
| 9 | Infinity | | | 8.794 | 0.000 |
| EFL | −7.817 | | | | |

SURF 0 = OBJECT PLANE
SURF 1 = ENTRANCE PUPIL PLANE
SURF 9 = IMAGE PLANE

TABLE 7

| SURF | RD (mm) | TH (mm) | MEDIUM | DIAMETER (mm) | CC |
|---|---|---|---|---|---|
| 0 | Infinity | 6.000 | | 8.402 | 0.000 |
| 1 | Infinity | 1.900 | | 0.240 | 0.000 |
| 2 | Infinity | 2.500 | ACRYLIC | 5.000 | 0.000 |
| 3 | −2.000 | 2.700 | | 5.000 | −0.660 |
| 4 | Infinity | 2.000 | ACRYLIC | 6.000 | 0.000 |
| 5 | −16.800 | 25.000 | | 6.000 | 32.000 |
| 6 | Infinity | 2.000 | ACRYLIC | 7.000 | 0.000 |
| 7 | −9.600 | 31.200 | | 7.000 | −1.200 |
| 8 | Infinity | 2.000 | ACRYLIC | 6.000 | 0.000 |
| 9 | −17.850 | 24.680 | | 6.000 | −28.000 |
| 10 | Infinity | | | 7.917 | 0.000 |
| EFL | −5.302 | | | | |

SURF 0 = OBJECT PLANE
SURF 1 = ENTRANCE PUPIL PLANE
SURF 10 = IMAGE PLANE

TABLE 8

| SURF | RD (mm) | TH (mm) | MEDIUM | DIAMETER (mm) | CC |
|---|---|---|---|---|---|
| 0 | Infinity | 6.000 | | 6.928 | 0.000 |
| 1 | Infinity | 3.200 | | 0.300 | 0.000 |
| 2 | Infinity | 2.500 | ACRYLIC | 5.400 | 0.000 |
| 3 | −2.500 | 3.000 | | 5.400 | −0.640 |
| 4 | Infinity | 2.000 | ACRYLIC | 6.400 | 0.000 |
| 5 | −26.000 | 24.700 | | 6.400 | 57.000 |

TABLE 8-continued

| SURF | RD (mm) | TH (mm) | MEDIUM | DIAMETER (mm) | CC |
|---|---|---|---|---|---|
| 6 | Infinity | 2.000 | ACRYLIC | 6.400 | 0.000 |
| 7 | −9.200 | 25.000 | | 6.400 | −1.000 |
| 8 | −4.300 | 1.200 | POLYCARB | 4.400 | −0.300 |
| 9 | Infinity | 2.000 | ACRYLIC | 6.000 | 0.000 |
| 10 | −3.610 | 28.350 | | 6.000 | −0.700 |
| 11 | Infinity | | | 6.930 | 0.000 |
| EFL | −5.602 | | | | |

SURF 0 = OBJECT PLANE
SURF 1 = ENTRANCE PUPIL PLANE
SURF 11 = IMAGE PLANE

TABLE 9

| SURF | RD (mm) | TH (mm) | MEDIUM | DIAMETER (mm) | CC |
|---|---|---|---|---|---|
| 0 | Infinity | 3.000 | | 3.464 | 0.000 |
| 1 | Infinity | 2.400 | | 0.300 | 0.000 |
| 2 | 12.400 | 3.000 | ACRYLIC | 5.400 | 0.000 |
| 3 | −2.320 | 9.700 | | 5.400 | −0.800 |
| 4 | −7.600 | 2.000 | ACRYLIC | 6.400 | 0.000 |
| 5 | −8.100 | 15.900 | | 6.400 | 2.800 |
| 6 | Infinity | 2.000 | ACRYLIC | 6.400 | 0.000 |
| 7 | −10.000 | 28.500 | | 6.400 | −1.200 |
| 8 | −24.000 | 1.20 | POLYCARB | 6.000 | 70.000 |
| 9 | 5.000 | 2.500 | ACRYLIC | 6.000 | 0.000 |
| 10 | −6.360 | 29.820 | | 6.000 | 0.000 |
| 11 | Infinity | | | 7.031 | 0.000 |
| EFL | −4.891 | | | | |

SURF 0 = OBJECT PLANE
SURF 1 = ENTRANCE PUPIL PLANE
SURF 11 = IMAGE PLANE

TABLE 10

| SURF | RD (mm) | TH (mm) | MEDIUM | DIAMETER (mm) | CC |
|---|---|---|---|---|---|
| 0 | Infinity | 8.000 | | 13.426 | 0.000 |
| 1 | Infinity | 0.100 | | 0.200 | 0.000 |
| 2 | Infinity | 3.800 | SF6 | 5.380 | 0.000 |
| 3 | Infinity | 1.800 | LAH66 | 5.380 | 0.000 |
| 4 | −4.300 | 0.200 | | 6.400 | 0.000 |
| 5 | 11.400 | 1.500 | LAH66 | 6.400 | 0.000 |
| 6 | −17.000 | 10.000 | | 6.400 | 0.000 |
| 7 | Infinity | 2.000 | LAH66 | 6.400 | 0.000 |
| 8 | −18.900 | 40.300 | | 6.400 | 0.000 |
| 9 | 13.000 | 2.000 | TIH53 | 6.400 | 0.000 |
| 10 | 8.500 | 2.500 | FPL51 | 6.400 | 0.000 |
| 11 | −19.300 | 39.800 | | 6.400 | 0.000 |
| 12 | Infinity | 2.000 | LAH66 | 6.400 | 0.000 |
| 13 | −8.340 | 20.000 | | 6.400 | 0.000 |
| 14 | Infinity | 2.000 | SP15 | 6.400 | 0.000 |
| 15 | −8.830 | 14.040 | | 6.400 | 0.000 |
| 16 | Infinity | | | 6.607 | 0.000 |
| EFL | 3.782 | | | | |

SURF 0 = OBJECT PLANE
SURF 1 = ENTRANCE PUPIL PLANE;
SURF 16 = IMAGE PLANE
For SURF 15, AD = 9.0E−4, and AE = 2.0E−5.

TABLE 11

| SURF | RD (mm) | TH (mm) | MEDIUM | DIAMETER (mm) | CC |
|---|---|---|---|---|---|
| 0 | Infinity | 12.000 | | 13.856 | 0.000 |
| 1 | Infinity | 0.100 | | 0.200 | 0.000 |
| 2 | Infinity | 4.500 | SF6 | 5.380 | 0.000 |
| 3 | Infinity | 2.000 | LAH66 | 6.400 | 0.000 |
| 4 | −4.300 | 0.200 | | 6.400 | 0.000 |

TABLE 11-continued

| SURF | RD (mm) | TH (mm) | MEDIUM | DIAMETER (mm) | CC |
|---|---|---|---|---|---|
| 5 | 38.000 | 1.500 | LAH66 | 6.400 | 0.000 |
| 6 | −14.000 | 15.000 | | 6.400 | 0.000 |
| 7 | Infinity | 1.600 | LAH66 | 6.400 | 0.000 |
| 8 | −14.000 | 27.000 | | 6.400 | 0.000 |
| 9 | 50.000 | 1.200 | TIH53 | 6.400 | 0.000 |
| 10 | 4.500 | 3.000 | FPL51 | 6.400 | 0.000 |
| 11 | −4.700 | 28.800 | | 6.400 | 0.000 |
| 12 | Infinity | 2.000 | LAH66 | 6.400 | 0.000 |
| 13 | −11.000 | 26.700 | | 6.400 | 0.000 |
| 14 | Infinity | 2.000 | LAH66 | 6.400 | 0.000 |
| 15 | −9.900 | 27.300 | | 6.400 | 0.000 |
| 16 | −14.700 | 2.000 | LAH66 | 6.400 | 0.000 |
| 17 | −8.000 | 40.700 | | 6.400 | 0.000 |
| 18 | Infinity | 2.000 | LAH66 | 6.400 | 0.000 |
| 19 | −20.330 | 50.400 | | 6.400 | 0.000 |
| 20 | Infinity | | | 6.215 | 0.000 |
| EFL | −5.739 | | | | |

SURF 0 = OBJECT PLANE
SURF 1 = ENTRANCE PUPIL PLANE
SURF 20 = IMAGE PLANE

TABLE 12

| SURF | RD (mm) | TH (mm) | MEDIUM | DIAMETER (mm) | CC |
|---|---|---|---|---|---|
| 0 | Infinity | 8.600 | | 26.000 | 0.000 |
| 1 | Infinity | 0.300 | SAPPHIRE | 1.620 | 0.000 |
| 2 | 0.700 | 0.800 | | 1.056 | 0.000 |
| 3 | Infinity | 1.900 | TIH6 | 0.880 | 0.000 |
| 4 | Infinity | 0.600 | TIH6 | 0.552 | 0.000 |
| 5 | Infinity | 0.800 | LAH53 | 0.808 | 0.000 |
| 6 | −1.600 | 2.700 | | 1.106 | 0.000 |
| 7 | Infinity | 3.000 | LAH53 | 1.628 | 0.000 |
| 8 | Infinity | 2.850 | LAH53 | 1.938 | 0.000 |
| 9 | −4.300 | 0.300 | | 2.497 | 0.000 |
| 10 | Infinity | 30.600 | TIH6 | 2.490 | 0.000 |
| 11 | 3.600 | 1.200 | PHM52 | 2.418 | 0.000 |
| 12 | −7.160 | 0.300 | | 2.504 | 0.000 |
| 13 | 10.100 | 23.750 | LAH53 | 2.486 | 0.000 |
| 14 | Infinity | 2.000 | | 2.094 | 0.000 |
| 15 | Infinity | 2.000 | | 2.033 | 0.000 |
| 16 | 7.160 | 28.200 | LAH53 | 2.493 | 0.000 |
| 17 | Infinity | 0.400 | | 2.469 | 0.000 |
| 18 | 7.540 | 28.700 | LAH53 | 2.490 | 0.000 |
| 19 | −16.000 | 2.000 | | 2.448 | 0.000 |
| 20 | Infinity | 2.000 | | 2.230 | 0.000 |
| 21 | 10.100 | 30.000 | LAH53 | 2.491 | 0.000 |
| 22 | −7.540 | 0.400 | | 2.425 | 0.000 |
| 23 | Infinity | 28.200 | LAH53 | 2.427 | 0.000 |
| 24 | Infinity | 1.955 | | 2.489 | 0.000 |
| 25 | Infinity | | | 2.497 | 0.000 |
| EFL | −1.455 | | | | |

SURF 0 = OBJECT PLANE
SURF 4 = PUPIL PLANE
SURF 25 = IMAGE PLANE

TABLE 13

| SURF | RD (mm) | TH (mm) | MEDIUM | DIAMETER (mm) | CC |
|---|---|---|---|---|---|
| 0 | Infinity | 8.600 | | 26.000 | 0.000 |
| 1 | Infinity | 0.300 | SAPPHIRE | 1.620 | 0.000 |
| 2 | 0.700 | 0.800 | | 1.056 | 0.000 |
| 3 | Infinity | 1.900 | TIH6 | 0.880 | 0.000 |
| 4 | Infinity | 0.600 | TIH6 | 0.552 | 0.000 |
| 5 | Infinity | 0.800 | LAH53 | 0.808 | 0.000 |
| 6 | −1.470 | 2.200 | | 1.103 | 0.000 |
| 7 | Infinity | 3.000 | LAH53 | 1.408 | 0.000 |
| 8 | Infinity | 2.850 | LAH53 | 1.628 | 0.000 |
| 9 | −4.000 | 0.300 | | 2.342 | 0.000 |

TABLE 13-continued

| SURF | RD (mm) | TH (mm) | MEDIUM | DIAMETER (mm) | CC |
|---|---|---|---|---|---|
| 10 | Infinity | 29.500 | TIH6 | 2.341 | 0.000 |
| 11 | Infinity | 0.300 |  | 2.493 | 0.000 |
| 12 | 7.570 | 27.000 | LAH53 | 2.518 | 0.000 |
| 13 | Infinity | 2.000 |  | 2.189 | 0.000 |
| 14 | Infinity | 2.000 |  | 2.155 | 0.000 |
| 15 | 7.570 | 32.700 | LAH53 | 2.505 | 0.000 |
| 16 | −7.570 | 0.400 |  | 2.415 | 0.000 |
| 17 | 10.060 | 1.500 | PHM52 | 2.383 | 0.000 |
| 18 | −2.760 | 27.000 | TIH6 | 2.262 | 0.000 |
| 19 | −7.000 | 2.000 |  | 2.567 | 0.000 |
| 20 | Infinity | −2.000 |  | 2.028 | 0.000 |
| 21 | Infinity | 24.000 | LAH53 | 2.080 | 0.000 |
| 22 | −7.000 | 0.400 |  | 2.508 | 0.000 |
| 23 | Infinity | 29.500 | LAH53 | 2.506 | 0.000 |
| 24 | Infinity | 1.850 |  | 2.442 | 0.000 |
| 25 | Infinity |  |  | 2.443 | 0.000 |
| EFL | −1.447 |  |  |  |  |

SURF 0 = OBJECT PLANE
SURF 4 = PUPIL PLANE
SURF 25 = IMAGE PLANE

TABLE 14

| SURF | RD (mm) | TH (mm) | MEDIUM | DIAMETER (mm) | CC |
|---|---|---|---|---|---|
| 0 | Infinity | 8.600 |  | 26.000 | 0.000 |
| 1 | Infinity | 0.300 | SAPPHIRE | 1.619 | 0.000 |
| 2 | 0.700 | 0.800 |  | 1.055 | 0.000 |
| 3 | Infinity | 1.900 | LAH53 | 0.880 | 0.000 |
| 4 | Infinity | 0.600 | LAH53 | 0.552 | 0.000 |
| 5 | Infinity | 1.300 | LAH53 | 0.808 | 0.000 |
| 6 | −1.730 | 3.000 |  | 1.307 | 0.000 |
| 7 | Infinity | 3.000 | LAH53 | 1.707 | 0.000 |
| 8 | Infinity | 3.300 | LAH53 | 1.920 | 0.000 |
| 9 | −4.800 | 0.300 |  | 2.480 | 0.000 |
| 10 | Infinity | 31.500 | TIH6 | 2.477 | 0.000 |
| 11 | Infinity | 0.300 |  | 2.397 | 0.000 |
| 12 | 7.500 | 25.700 | LAH53 | 2.415 | 0.000 |
| 13 | Infinity | 2.000 |  | 2.174 | 0.000 |
| 14 | Infinity | 2.000 |  | 2.154 | 0.000 |
| 15 | 6.900 | 31.500 | LAH53 | 2.499 | 0.000 |
| 16 | −6.900 | 0.400 |  | 2.511 | 0.000 |
| 17 | Infinity | 21.900 | LAH53 | 2.489 | 0.000 |
| 18 | Infinity | 2.000 | TIH6 | 2.128 | 0.000 |
| 19 | Infinity | 2.000 |  | 2.087 | 0.000 |
| 20 | 7.500 | 31.500 | LAH53 | 2.500 | 0.000 |
| 21 | −6.100 | 0.400 |  | 2.475 | 0.000 |
| 22 | 21.400 | 1.500 | BAFN11 | 2.318 | 0.000 |
| 23 | −2.270 | 25.700 | TIH6 | 2.192 | 0.000 |
| 24 | Infinity | 2.100 |  | 2.471 | 0.000 |
| 25 | Infinity |  |  | 2.512 | 0.000 |
| EFL | −1.443 |  |  |  |  |

SURF 0 = OBJECT PLANE
SURF 4 = PUPIL PLANE
SURF 25 = IMAGE PLANE

TABLE 15

| SURF | RD (mm) | TH (mm) | MEDIUM | DIAMETER (mm) | CC |
|---|---|---|---|---|---|
| 0 | Infinity | 8.600 |  | 26.000 | 0.000 |
| 1 | Infinity | 0.300 | LAH66 | 1.486 | 0.000 |
| 2 | 0.600 | 0.800 |  | 0.937 | 0.000 |
| 3 | Infinity | 1.800 | LAH66 | 0.819 | 0.000 |
| 4 | Infinity | 0.700 | LAH66 | 0.611 | 0.000 |
| 5 | Infinity | 1.000 | LAH66 | 0.908 | 0.000 |
| 6 | −1.600 | 2.900 |  | 1.277 | 0.000 |

TABLE 15-continued

| SURF | RD (mm) | TH (mm) | MEDIUM | DIAMETER (mm) | CC |
|---|---|---|---|---|---|
| 7 | Infinity | 3.000 | LAH66 | 1.577 | 0.000 |
| 8 | Infinity | 4.000 | LAH66 | 1.745 | 0.000 |
| 9 | −4.600 | 0.300 |  | 2.405 | 0.000 |
| 10 | Infinity | 31.000 | TIH6 | 2.405 | 0.000 |
| 11 | 4.500 | 0.010 |  | 2.449 | 5.300 |
| 12 | 2.700 | 28.000 | LAH66 | 2.550 | 0.000 |
| 13 | Infinity | 2.000 |  | 1.927 | 0.000 |
| 14 | Infinity | 2.100 |  | 1.864 | 0.000 |
| 15 | 7.600 | 28.000 | LAH66 | 2.159 | −2.700 |
| 16 | Infinity | 0.300 |  | 2.438 | 0.000 |
| 17 | 7.100 | 20.500 | LAH66 | 2.445 | 11.300 |
| 18 | Infinity | 2.000 |  | 1.832 | 0.000 |
| 19 | Infinity | 2.000 |  | 1.872 | 0.000 |
| 20 | 5.620 | 31.000 | LAH66 | 2.463 | −1.000 |
| 21 | −6.800 | 0.300 |  | 2.420 | −10.700 |
| 22 | Infinity | 31.000 | LAH66 | 2.420 | 0.000 |
| 23 | Infinity | 1.970 |  | 2.514 | 0.000 |
| 24 | Infinity |  |  | 2.688 | 0.000 |
| EFL | −1.563 |  |  |  |  |

SURF 0 = OBJECT PLANE
SURF 4 = PUPIL PLANE
SURF 24 = IMAGE PLANE

TABLE 16

| SURF | RD (mm) | TH (mm) | MEDIUM | DIAMETER (mm) | CC |
|---|---|---|---|---|---|
| 0 | Infinity | 8.600 |  | 26.000 | 0.000 |
| 1 | Infinity | 0.400 | COC | 1.810 | 0.000 |
| 2 | 0.530 | 0.400 |  | 0.944 | 0.000 |
| 3 | Infinity | 2.000 | SF6 | 0.899 | 0.000 |
| 4 | Infinity | 1.000 | SF6 | 0.459 | 0.000 |
| 5 | Infinity | 1.300 | COC | 0.948 | 0.000 |
| 6 | −1.200 | 2.400 |  | 1.541 | 0.000 |
| 7 | Infinity | 4.200 | SF6 | 1.717 | 0.000 |
| 8 | Infinity | 2.800 | SF6 | 1.870 | 0.000 |
| 9 | Infinity | 0.300 |  | 2.320 | 0.000 |
| 10 | 3.700 | 1.500 | COC | 2.503 | −0.300 |
| 11 | Infinity | 29.200 | LAH66 | 2.473 | 0.000 |
| 12 | Infinity | 1.500 | POLYSTYR | 2.175 | 0.000 |
| 13 | 3.120 | 1.500 | COC | 2.287 | 0.000 |
| 14 | −4.310 | 0.500 |  | 2.487 | −3.450 |
| 15 | Infinity | 29.200 | LAH66 | 2.487 | 0.000 |
| 16 | Infinity | 1.500 | COC | 2.503 | 0.000 |
| 17 | −5.120 | 2.300 |  | 2.504 | −4.300 |
| 18 | Infinity | 2.200 |  | 2.167 | 0.000 |
| 19 | Infinity | 25.000 | SF6 | 2.120 | 0.000 |
| 20 | Infinity | 0.300 |  | 2.458 | 0.000 |
| 21 | 4.470 | 1.500 | COC | 2.495 | 1.080 |
| 22 | Infinity | 19.600 | LAH66 | 2.322 | 0.000 |
| 23 | Infinity | 2.300 |  | 1.756 | 0.000 |
| 24 | Infinity | 2.200 |  | 1.775 | 0.000 |
| 25 | 3.420 | 1.500 | COC | 2.482 | −7.200 |
| 26 | Infinity | 25.000 | SF6 | 2.482 | 0.000 |
| 27 | Infinity | 1.500 | COC | 2.488 | 0.000 |
| 28 | −5.120 | 0.300 |  | 2.489 | −1.800 |
| 29 | Infinity | 25.000 | SF6 | 2.465 | 0.000 |
| 30 | Infinity | 5.520 |  | 2.495 | 0.000 |
| 31 | Infinity |  |  | 2.620 | 0.000 |
| EFL | −1.626 |  |  |  |  |

SURF 0 = OBJECT PLANE
SURF 4 = PUPIL PLANE
SURF 31 = IMAGE PLANE

TABLE 17

| SURF | RD (mm) | TH (mm) | MEDIUM | DIAMETER (mm) | CC |
|---|---|---|---|---|---|
| 0 | Infinity | 8.600 | | 26.000 | 0.000 |
| 1 | Infinity | 0.300 | TIH6 | 1.513 | 0.000 |
| 2 | 0.650 | 0.800 | | 0.979 | 0.000 |
| 3 | Infinity | 1.800 | TIH6 | 0.836 | 0.000 |
| 4 | Infinity | 0.700 | TIH6 | 0.591 | 0.000 |
| 5 | Infinity | 1.500 | LAH51 | 0.887 | 0.000 |
| 6 | −1.680 | 2.800 | | 1.457 | 0.000 |
| 7 | Infinity | 3.000 | LAH51 | 1.546 | 0.000 |
| 8 | Infinity | 5.000 | LAH51 | 1.597 | 0.000 |
| 9 | −4.600 | 0.300 | | 2.493 | 0.580 |
| 10 | Infinity | 25.700 | TIH6 | 2.464 | 0.000 |
| 11 | 3.470 | 1.200 | PHM52 | 2.286 | 0.000 |
| 12 | −3.860 | 0.300 | | 2.490 | 0.700 |
| 13 | Infinity | 21.600 | LAH51 | 2.478 | 0.000 |
| 14 | Infinity | 2.000 | | 2.205 | 0.000 |
| 15 | Infinity | 2.100 | | 2.159 | 0.000 |
| 16 | 7.400 | 33.800 | LAH51 | 2.494 | −6.600 |
| 17 | Infinity | 0.400 | | 2.470 | 0.000 |
| 18 | 6.920 | 27.900 | LAH51 | 2.497 | −9.200 |
| 19 | Infinity | 2.100 | | 2.181 | 0.000 |
| 20 | Infinity | 2.000 | | 2.141 | 0.000 |
| 21 | 7.400 | 29.400 | LAH51 | 2.494 | −6.600 |
| 22 | −7.700 | 0.400 | | 2.492 | 5.600 |
| 23 | Infinity | 27.900 | LAH51 | 2.348 | 0.000 |
| 24 | Infinity | 1.980 | | 2.496 | 0.000 |
| 25 | Infinity | | | 2.634 | 0.000 |
| EFL | −1.509 | | | | |

SURF 0 = OBJECT PLANE
SURF 4 = PUPIL PLANE
SURF 25 = IMAGE PLANE

TABLE 18

| SURF | RD (mm) | TH (mm) | MEDIUM | DIAMETER (mm) | CC |
|---|---|---|---|---|---|
| 0 | Infinity | 8.600 | | 26.000 | 0.000 |
| 1 | Infinity | 0.300 | SAPPHIRE | 1.593 | 0.000 |
| 2 | 0.680 | 0.800 | | 1.032 | 0.000 |
| 3 | Infinity | 1.863 | TIH6 | 0.864 | 0.000 |
| 4 | Infinity | 0.672 | TIH6 | 0.559 | 0.000 |
| 5 | Infinity | 0.728 | LAH53 | 0.845 | 0.000 |
| 6 | −1.508 | 2.170 | | 1.110 | 0.000 |
| 7 | Infinity | 3.000 | LAH53 | 1.439 | 0.000 |
| 8 | Infinity | 3.750 | LAH53 | 1.680 | 0.000 |
| 9 | −4.230 | 0.311 | | 2.492 | 0.000 |
| 10 | Infinity | 13.700 | TIH6 | 2.484 | 0.000 |
| 11 | Infinity | 0.500 | | 2.428 | 0.000 |
| 12 | Infinity | 13.700 | TIH6 | 2.425 | 0.000 |
| 13 | Infinity | 1.000 | TIH6 | 2.385 | 0.000 |
| 14 | 3.483 | 1.200 | PHM52 | 2.395 | 0.000 |
| 15 | −6.510 | 0.308 | | 2.493 | 0.000 |
| 16 | 11.050 | −1.600 | LAH53 | 2.490 | 0.000 |
| 17 | Infinity | 7.670 | LAH53 | 2.463 | 0.000 |
| 18 | Infinity | 0.500 | | 2.328 | 0.000 |
| 19 | Infinity | 13.300 | LAH53 | 2.312 | 0.000 |
| 20 | Infinity | 2.000 | | 2.078 | 0.000 |
| 21 | Infinity | 2.085 | | 2.014 | 0.000 |
| 22 | 6.830 | 1.800 | LAH53 | 2.490 | 0.000 |
| 23 | Infinity | 13.300 | LAH53 | 2.472 | 0.000 |
| 24 | Infinity | 0.500 | | 2.333 | 0.000 |
| 25 | Infinity | 13.300 | LAH53 | 2.324 | 0.000 |
| 26 | Infinity | 0.400 | | 2.353 | 0.000 |
| 27 | 7.850 | 1.400 | LAH53 | 2.487 | 0.000 |
| 28 | Infinity | 13.300 | LAH53 | 2.488 | 0.000 |
| 29 | Infinity | 0.500 | | 2.491 | 0.000 |
| 30 | Infinity | 13.300 | LAH53 | 2.492 | 0.000 |
| 31 | Infinity | 1.200 | LAH53 | 2.495 | 0.000 |
| 32 | −14.020 | 2.044 | | 2.496 | 0.000 |
| 33 | Infinity | 2.044 | | 2.187 | 0.000 |
| 34 | 14.020 | 1.200 | LAH53 | 2.429 | 0.000 |
| 35 | Infinity | 13.300 | LAH53 | 2.427 | 0.000 |
| 36 | Infinity | 0.500 | | 2.395 | 0.000 |
| 37 | Infinity | 13.300 | LAH53 | 2.393 | 0.000 |
| 38 | Infinity | 1.400 | LAH53 | 2.433 | 0.000 |
| 39 | −7.850 | 0.400 | | 2.473 | 0.000 |
| 40 | Infinity | 13.300 | LAH53 | 2.373 | 0.000 |
| 41 | Infinity | 0.500 | | 2.427 | 0.000 |
| 42 | Infinity | 13.300 | LAH53 | 2.431 | 0.000 |
| 43 | Infinity | 3.573 | | 2.493 | 0.000 |
| 44 | Infinity | | | 2.524 | 0.000 |
| EFL | −1.475 | | | | |

SURF 0 = OBJECT PLANE
SURF 4 = PUPIL PLANE
SURF 44 = IMAGE PLANE

TABLE 19

| MEDIUM | $<_d$ | $N_{480nm}$ | $N_{546nm}$ | $N_{644nm}$ | MANUFACTURER |
|---|---|---|---|---|---|
| Acrylic | 57.4 | 1.498 | 1.494 | 1.489 | |
| BAFN 11 | 48.4 | 1.677 | 1.670 | 1.633 | Schott |
| COC | 55.7 | 1.541 | 1.536 | 1.531 | |
| FPL 51 | 81.6 | 1.495 | 1.498 | 1.502 | Ohara |
| LAH51 | 44.2 | 1.799 | 1.790 | 1.781 | Ohara |
| LAH 53 | 40.9 | 1.821 | 1.811 | 1.801 | Ohara |
| LAH 66 | 49.6 | 1.784 | 1.776 | 1.769 | Ohara |
| LAK 8 | 53.8 | 1.723 | 1.716 | 1.710 | Schott |
| LAKN 7 | 58.5 | 1.660 | 1.654 | 1.649 | Schott |
| LASF 32 | 30.4 | 1.824 | 1.810 | 1.797 | Schott |
| SAPPHIRE | 72.2 | 1.776 | 1.771 | 1.765 | |
| SF6 | 25.4 | 1.830 | 1.813 | 1.798 | Schott |
| SF15 | 30.1 | 1.693 | 1.704 | 1.717 | Schott |
| SK5 | 61.3 | 1.596 | 1.591 | 1.587 | Schott |
| TIH6 | 25.4 | 1.830 | 1.813 | 1.798 | Ohara |
| PHM52 | 63.4 | 1.625 | 1.620 | 1.616 | Ohara |
| Polycarbonate | 29.9 | 1.601 | 1.590 | 1.581 | |
| Polystyrene | 30.9 | 1.605 | 1.595 | 1.586 | |

TABLE 20

| 1 No | 2 NA | 3 FOV deg | 4 Mag | 5 SC | 6 Rl no | 7 Oe tot | 8 Le tot +,- | 9 Le obj +,- | 10 Le rel1 +,- | 11 Le rel2 +,- | 12 Le rel3 +,- | 13 lng mm | 14 c.s tot |
|---|---|---|---|---|---|---|---|---|---|---|---|---|---|
| 1 | .020 | 60 | 1.0 | 1.62 | 1 | 3 | 3,0 | 1,0 | 2,0 | | | 100 | 6 |
| 2 | .020 | 60 | 1.0 | 1.15 | 1 | 3 | 3,0 | 1,0 | 2,0 | | | 100 | 3 |
| 3 | .020 | 60 | 1.0 | 0.55 | 1 | 3 | 3,0 | 1,0 | 2,0 | | | 100 | 5 |
| 4 | .020 | 60 | 1.0 | 0.99 | 1 | 4 | 3,0 | 2,0 | 1,0 | | | 100 | 4 |
| 5 | .015 | 70 | 1.0 | 0.84 | 1 | 5 | 4,1 | 2,0 | 2,1 | | | 100 | 7 |
| 6 | 0.025 | 60 | 0.0 | 0.96 | 1 | 4 | 3,1 | 1,0 | 2,1 | | | 94 | 5 |
| 7 | .020 | 70 | 1.0 | 0.72 | 1 | 4 | 4,0 | 2,0 | 2,0 | | | 100 | 4 |
| 8 | .025 | 60 | 1.0 | 1.06 | 1 | 5 | 4,1 | 2,0 | 2,1 | | | 100 | 5 |
| 9 | .025 | 60 | 2.0 | 1.47 | 1 | 5 | 3,2 | 1,0 | 2,2 | | | 100 | 9 |
| 10 | .025 | 80 | −0.5 | 1.03 | 2 | 7 | 6,1 | 2,0 | 2,1 | 2,0 | | 150 | 10 |
| 11 | .017 | 60 | 0.5 | 1.51 | 3 | 9 | 8,1 | 2,0 | 2,1 | 2,0 | 2,0 | 250 | 13 |
| 12 | .061 | 110 | .157 | 3.65 | 3 | 10 | 7,2 | 1,1 | 3,1 | 2,0 | 1,0 | 195 | 12 |
| 13 | .061 | 110 | .156 | 3.86 | 3 | 10 | 6,2 | 1,1 | 2,0 | 2,1 | 1,0 | 195 | 11 |
| 14 | .061 | 110 | .156 | 3.86 | 3 | 10 | 6,2 | 1,1 | 2,0 | 1,0 | 2,1 | 195 | 11 |
| 15 | .057 | 110 | .170 | 3.70 | 3 | 9 | 6,2 | 1,1 | 2,1 | 2,0 | 1,0 | 195 | 9 |
| 16 | .055 | 110 | .174 | 4.77 | 3 | 16 | 7,2 | 1,1 | 3,1 | 1,0 | 2,0 | 194 | 10 |
| 17 | .059 | 110 | .164 | 3.73 | 3 | 10 | 6,2 | 1,1 | 2,1 | 2,0 | 1,0 | 195 | 10 |
| 18 | .060 | 110 | .160 | 3.73 | 3 | 23 | 9,2 | 1,1 | 3,1 | 3,0 | 2,0 | 195 | 12 |

| 1 No | 15 c.s. tot <,c | 16 c.s obj <,c | 17 c.s rel1 <,c | 18 c.s. rel2 <,c | 19 c.s. rel3 <,c | 20 dis | 21 ptz | 22 wvl | 23 axc | 24 NP | 25 CA | 26 s/r |
|---|---|---|---|---|---|---|---|---|---|---|---|---|
| 1 | 6,0 | 2,0 | 4,0 | | | −2 | −.54 | .79 | .90 | −.5 | 5.0 | 1.62 |
| 2 | 3,0 | 1,0 | 2,0 | | | −2 | −.40 | .32 | .80 | 0.6 | 5.3 | 1.15 |
| 3 | 5,0 | 1,0 | 4,0 | | | −1 | −.18 | .10 | .21 | 6.0 | 20 | 0.55 |
| 4 | 3,1 | 2,1 | 1,0 | | | 2 | −.20 | .27 | .31 | 2.0 | 5.1 | 0.99 |
| 5 | 6,1 | 3,0 | 3,1 | | | −16 | −.25 | .31 | .12 | 1.9 | 5.2 | 0.84 |
| 6 | 4,1 | 2,0 | 2,1 | | | −3 | −.23 | .46 | .14 | 3.2 | 5.2 | 0.96 |
| 7 | 4,0 | 2,0 | 2,0 | | | −6 | −.24 | .27 | .63 | 1.9 | 5.2 | 0.72 |
| 8 | 4,1 | 2,0 | 2,1 | | | −1 | −.19 | .21 | .31 | 3.2 | 5.2 | 1.06 |
| 9 | 6,3 | 2,0 | 4,3 | | | 1 | −.23 | .15 | .03 | 2.4 | 5.8 | 1.47 |
| 10 | 9,1 | 3,0 | 4,1 | 2,0 | | −2 | −.33 | .31 | .35 | 2.2 | 5.5 | 0.52 |
| 11 | 11,2 | 3,0 | 4,1 | 2,0 | 2,1 | −11 | −.36 | .48 | .04 | 2.6 | 5.5 | 0.50 |
| 12 | 10,2 | 1,1 | 4,1 | 3,0 | 2,0 | −39 | −.10 | .34 | .22 | −.8 | 2.5 | 1.22 |
| 13 | 9,2 | 1,1 | 2,0 | 5,1 | 1,0 | −40 | −.12 | .32 | .19 | −.8 | 2.5 | 1.29 |
| 14 | 9,2 | 1,1 | 2,0 | 2,0 | 4,1 | −39 | −.05 | .51 | .17 | −.8 | 2.5 | 1.29 |
| 15 | 7,2 | 1,1 | 2,1 | 2,0 | 2,0 | −40 | .04 | .81 | .68 | −.7 | 2.5 | 1.23 |
| 16 | 8,2 | 1,1 | 4,1 | 1,0 | 2,0 | −42 | −.12 | .41 | .19 | −.9 | 2.5 | 1.59 |
| 17 | 8,2 | 1,1 | 3,1 | 2,0 | 2,0 | −40 | .01 | .28 | .28 | −.7 | 2.5 | 1.24 |
| 18 | 10,2 | 1,1 | 4,1 | 3,0 | 2,0 | −38 | −.09 | .23 | .26 | −.8 | 2.5 | 1.24 |

| | |
|---|---|
| Column 1 | Number of example. |
| Column 2 | Numerical aperature at image. (The sine of the marginal axial ray angle times the refractive index.) |
| Column 3 | Total field of view in degrees. |
| Column 4 | Magnification. |
| Column 5 | Sum of the absolute values of all curvatures, in 1/mm. |
| Column 6 | Number of relays. |
| Column 7 | Total number of optical elements, plano-plano rods included, prism excluded. |
| Column 8 | Total number of positive and of negative lens elements. |
| Column 9 | Number of positive and of negative lens elements in the objective part. |
| Column 10 | Number of positive and of negative lens elements in the first relay. |
| Column 11 | Number of positive and of negative lens elements in the second relay. |
| Column 12 | Number of positive and of negative lens elements in the third relay. |
| Column 13 | Distance of the first surface or the object plane to the image plane in mm. |
| Column 14 | Total number of curved surfaces. |
| Column 15 | Number of curved convex surfaces and of concave surfaces. |
| Column 16 | Number of convex and of concave surfaces of the objective part. |
| Column 17 | Number of convex and of concave surfaces of the first relay. |
| Column 18 | Number of convex and of concave surfaces of the second relay. |
| Column 19 | Number of convex and of concave surfaces of the third relay. |
| Column 20 | Maximum image distortion in %. |
| Column 21 | Petzval curvature in 1/mm. |
| Column 22 | Peak to valley wavefront aberration over the full field at e-light in waves. |
| Column 23 | Maximum axial wavefront aberration between F- and C- light in waves. |
| Column 24 | Entrance pupil location in mm towards first surface of first lens (air equivalent value) |
| Column 25 | Maximum clear aperature of endoscope in mm. |
| Column 26 | Sum of the absolute values of the curvatures divided by the number of relays, in 1/mm. |

What is claimed is:

1. A color corrected endoscope including a plurality of optical elements, said endoscope comprising:
   an objective system; and
   at least three relay systems optically aligned with said objective system, wherein said objective system and three of said at least three relay systems together include not more than 13 curved surfaces and wherein at least two of said at least three relay systems are not identical.

2. The endoscope of claim 1, wherein each of said optical elements is comprised of uniformly refractive material.

3. The endoscope of claim 1, wherein two of said relay systems together include no more than one negative element.

4. The endoscope of claim 1, wherein two of said relay systems together include no more than one concave surface with respect to incoming light.

5. The endoscope of claim 1, wherein said objective system and one of said relay systems together include only 1 negative element.

6. The endoscope of claim 1, wherein one of said relay systems includes no negative elements.

7. The endoscope of claim 1, said plurality of optical elements providing a monochromatic wavefront deformation of less than about 0.48 waves.

8. The endoscope of claim 1, wherein said optical elements are suitable for use with at least a portion of the spectrum extending from the FN to the CN spectral line and at least one of said optical elements provides color correction to said endoscope.

9. The endoscope of claim 1, said endoscope including a field expander.

10. A color corrected endoscope including a plurality of optical elements, said endoscope comprising:
   an objective system; and
   at least two relay systems including optical elements, said at least two relay systems optically aligned with said objective system,
   wherein said objective system and two of said at least two relay systems together include not more than 10 curved surfaces, and wherein said objective system and one of said at least two relay systems have not more than 2 optical elements of negative optical power, said optical elements suitable for use with at least a portion of the spectrum extending from the FN to the CN spectral line, at least one of said optical elements providing color correction to said endoscope, and
   said at least two relay systems include at least two non-identical relay systems.

11. A color corrected endoscopic system including a plurality of optical elements, comprising:
   an objective;
   at least one relay group aligned with said objective along an optical axis, said objective and said at least one relay group together including at least one, but not more than 2, elements of negative optical power, at least one of said plurality of optical elements providing color correction for said endoscopic system, and at least two non-identical relay groups.

12. The endoscopic system of claim 11, in which said non-identical relay groups include non-identical lens elements.

13. A method of imaging an object, comprising:
   providing an objective for forming a first image of the object;
   providing at least three relay systems optically aligned with the objective system, wherein the objective and the relay systems together include not more than 13 curved surfaces, the objective and the relay systems being suitable for use with at least a portion of the spectrum extending from the FN to the CN spectral line;
   receiving the first image with one of the relay systems;
   forming an output image with another of the relay systems, in which the output image can be received by a viewer; and
   providing at least one of the at least three relay systems with more aberration correction than the at least one of the at least three relay systems requires to be aberration corrected.

14. The method of claim 13, said objective and said relay systems providing a monochromatic wavefront deformation of less than about 0.48 waves.

15. A method of designing an integrated aberration corrected endoscope, comprising:
   providing a plurality of optical groups, wherein the groups are aligned along a common optical axis and each of the groups produces a respective image at a respective focal plane, the groups including an objective and at least one relay; and
   providing a first one of the groups with more aberration correction than the first group requires to be aberration corrected, wherein said first group is a relay; and
   providing a second one of the groups with less aberration correction than the second group requires to be aberration corrected, wherein the aberration correction of the first group compensates for lack of aberration correction in the second group to produce an aberration corrected endoscope.

16. The method of claim 15, in which substantially all of the aberration correction is performed in the first group and the corrected aberration is chromatic aberration.

17. The method of claim 15, in which substantially all of the color correction is performed by a single optical interface.

18. The method of claim 15, said optical groups providing a chromatic aberration of less than about 0.63 waves.

19. The method of claim 15, said optical groups providing a chromatic aberration of less than about 0.35 waves.

20. The method of claim 15, said optical groups providing a chromatic aberration of less than about 0.21 waves.

21. The method of claim 15, in which substantially all of the aberration correction is performed in the first group and in which the endoscope includes at least three relays.

22. The method of claim 15, in which the endoscope has no substantially meniscus shaped elements.

23. The method of claim 15, in which substantially all of the aberration correction is performed in the first group and in which the endoscope has not more than 2 substantially concave surfaces with respect to incoming light.

24. The method of claim 15, in which the endoscope has no more than 13 substantially curved surfaces.

25. The method of claim 15, further comprising providing a field expander.

* * * * *